(12) United States Patent
Ptasinski et al.

(10) Patent No.: US 9,191,400 B1
(45) Date of Patent: Nov. 17, 2015

(54) CYPHERTEXT (CT) ANALYTIC ENGINE AND METHOD FOR NETWORK ANOMALY DETECTION

(71) Applicants: Joanna N. Ptasinski, La Jolla, CA (US); Roger Casey, San Diego, CA (US); David Wasserman, San Diego, CA (US); Stephan Lapic, San Diego, CA (US)

(72) Inventors: Joanna N. Ptasinski, La Jolla, CA (US); Roger Casey, San Diego, CA (US); David Wasserman, San Diego, CA (US); Stephan Lapic, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 67 days.

(21) Appl. No.: 13/915,654

(22) Filed: Jun. 12, 2013

(51) Int. Cl.
    *H04L 29/14*     (2006.01)
    *H04L 29/06*     (2006.01)

(52) U.S. Cl.
    CPC ........ *H04L 63/1416* (2013.01); *H04L 63/1458* (2013.01)

(58) Field of Classification Search
    None
    See application file for complete search history.

(56) References Cited

U.S. PATENT DOCUMENTS

| | | | |
|---|---|---|---|
| 7,751,325 B2 * | 7/2010 | Krishnamurthy et al. | 370/233 |
| 8,831,041 B2 * | 9/2014 | Keith et al. | 370/477 |
| 8,839,430 B2 * | 9/2014 | Maatta et al. | 726/23 |
| 2008/0083029 A1 * | 4/2008 | Yeh et al. | 726/22 |
| 2010/0218250 A1 * | 8/2010 | Mori et al. | 726/22 |
| 2013/0269031 A1 * | 10/2013 | Nakao et al. | 726/22 |

OTHER PUBLICATIONS

Wei Xiong, Hanping Hu, Naixu Xiong, Laurence T Yang, Wen-Chih Peng, Xiaofei Wang, Yanzhen Qu. "Anomaly secure detection methods by analyzing dynamic characteristics of the network traffic in cloud communications". Information Sciences, Elsevier. Apr. 18, 2013. www.elsevier.com/locate/ins.*
Y. Gu, A. McCallum, D. Towsley, Detecting Anomalies in Network Traffic Using Maximum Entropy Estimation Technical Report, Department of Computer Science, University of Massachusetts (2005).
A.P. Dempster, N.M. Laird, and D.B. Rubin, Maximum Likelihood from Incomplete Data via the EM Algorithm. In J. Roy. Stat. Soc., 1-38 (1977).
Eric Slud, Handout on Empirical Distribution Function and Descriptive Statistics, Stat 430, University of Maryland, (2009).
E. Naone, Making cloud computing more secure: Homomorphic Encryption, MIT Technology Review, May/Jun. 2011, p. 50.
The Enclave STIG, V4R3 (Jan. 28, 2011).
The Network Intrusion Detection/Protection & Content Scanning Devices STIG V8R1 (Mar. 24, 2010).

* cited by examiner

*Primary Examiner* — Minh Dinh
*Assistant Examiner* — Wayne An
(74) *Attorney, Agent, or Firm* — SSC Pacific Patent Office; Steve Baldwin; Kyle Eppele

(57) ABSTRACT

In a cyphertext (CT) network, a method for detecting anomalies comprising analyzing cyphertext data flows within the CT network where the CT network includes one or more encryption devices for encrypting plaintext data packets into cyphertext data packets such that the cyphertext data flows are directed to one or more destination devices. The cyphertext data includes multiple CT data packets and each CT data packet includes header information where each header includes source address information, destination address information and differentiated service code point (DSCP) information representative of traffic class information. The method further includes analyzing the traffic class information of each header, including using maximum entropy estimation for detecting one or more anomalies within the traffic class distribution of each flow based on the header information for that traffic class.

4 Claims, 25 Drawing Sheets

CT flow analysis steps

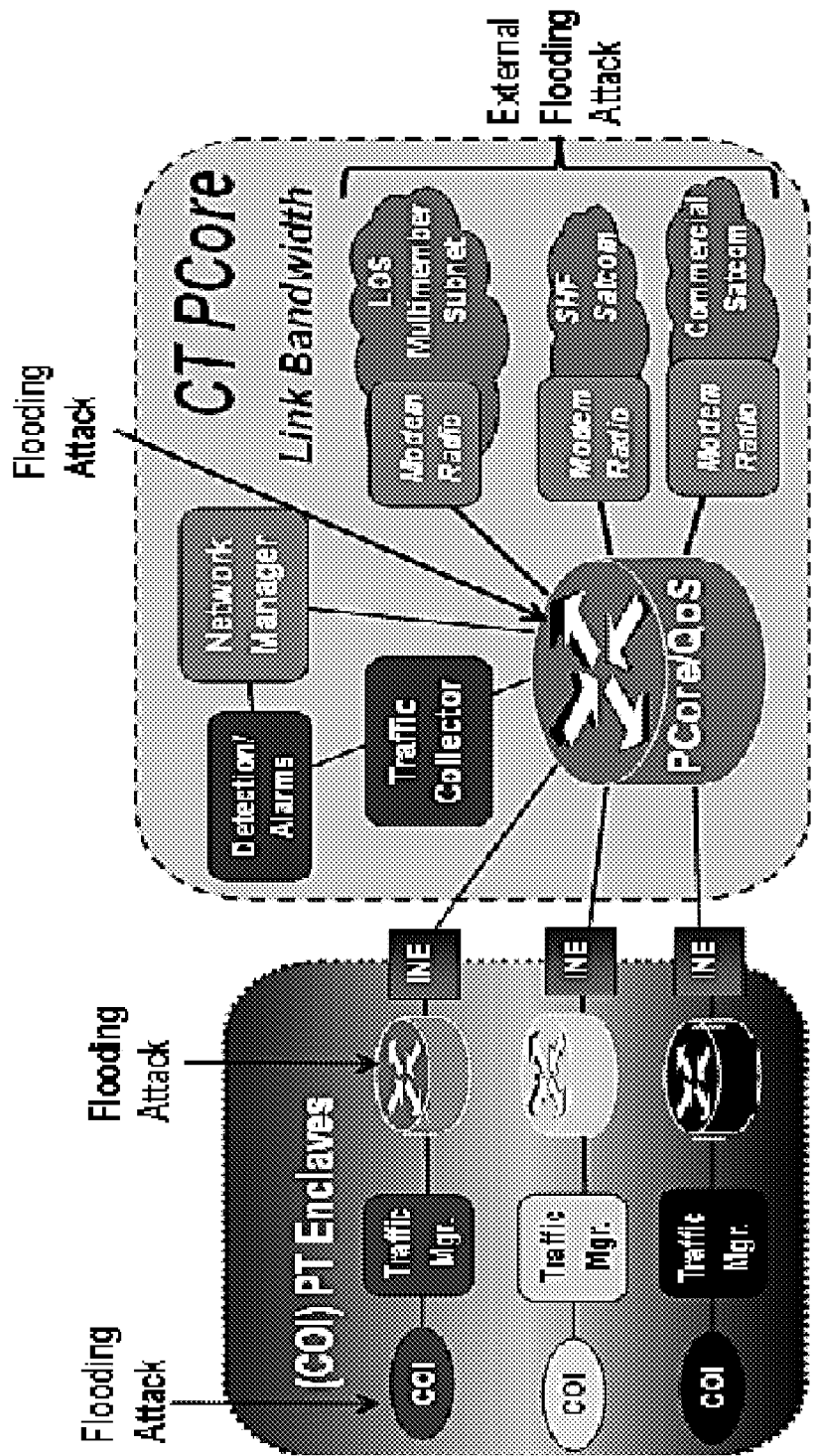
Figure 1: CT/PT Domains Overview

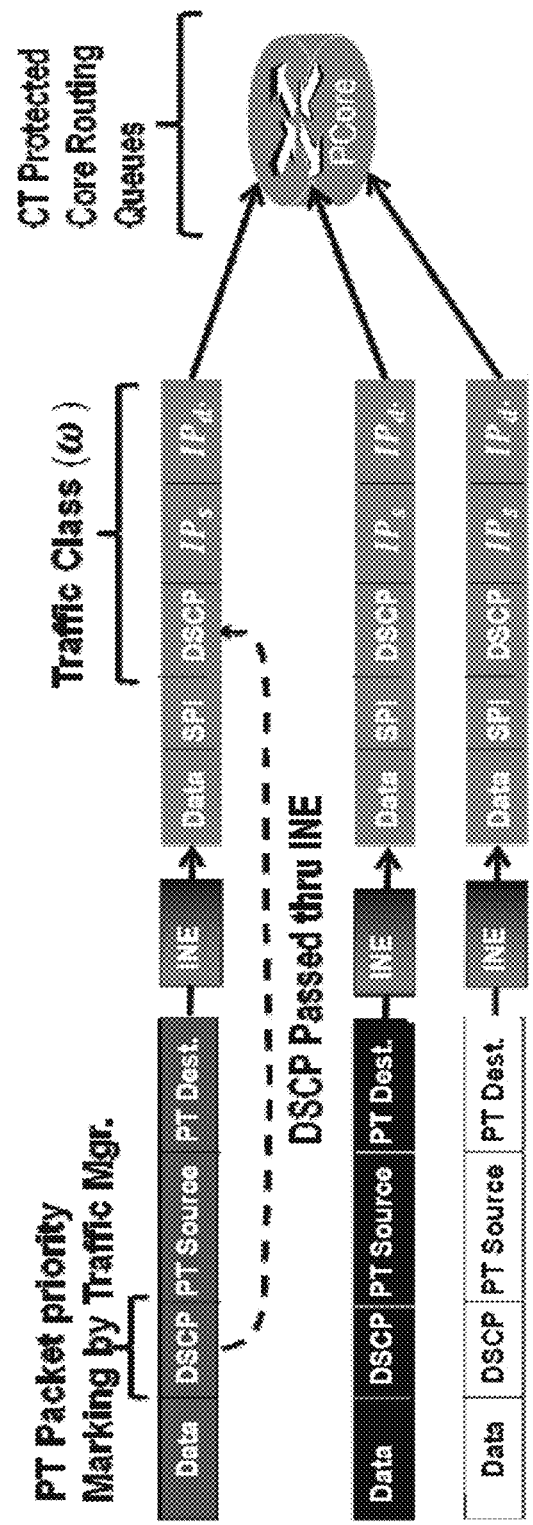
Figure 2    Traffic Class Definitions

| Source traffic classes | Security Enclave | Security Enclaves Applications | DSCP Class | Queues per Traffic Class |
|---|---|---|---|---|
| 1 | COI-1 | Network Control | CS6 | FIFO |
| 2 | | OSPF | CS6 | FIFO |
| 3 | | SIP | AF41 | FIFO |
| 4 | | | | |
| 5 | All | VoIP | EF | FIFO |
| 6 | | Call Mgr | CS5 | |
| 7 | | Video | AF43 | FIFO |
| 8 | COI-2 | Reserved for High Priority UDP | AF31 | FIFO |
| 9 | | Reserved for Medium Priority UDP | AF32 | |
| 10 | | Reserved for Low Priority UDP | AF33 | |
| 11 | | Reserved for high priority TCP app's | CS3 | CBWFQ |
| 12 | | Chat, DNS | AF22 | |
| 13 | | Whiteboard, Web | AF11 | |
| 14 | | Email | AF12 | |
| 15 | | Bulk Data (FTP) | AF13 | |
| 16 | | Default | CS0/BE | |
| 17 | COI-3 | | AF11 | CBWFQ |
| 18 | | | AF12 | |
| 19 | | | AF13 | |
| 20 | | | CS0/BE | |
| 21 | COI-4 | Whiteboard, Web | AF11 | |
| 22 | | Email | AF12 | |
| 23 | | Bulk Data (FTP) | AF13 | |
| 24 | | Default | CS0/BE | |
| 25 | | Scavenger | CS1/LE | |

Figure 3  Example Navy Traffic Class Definition

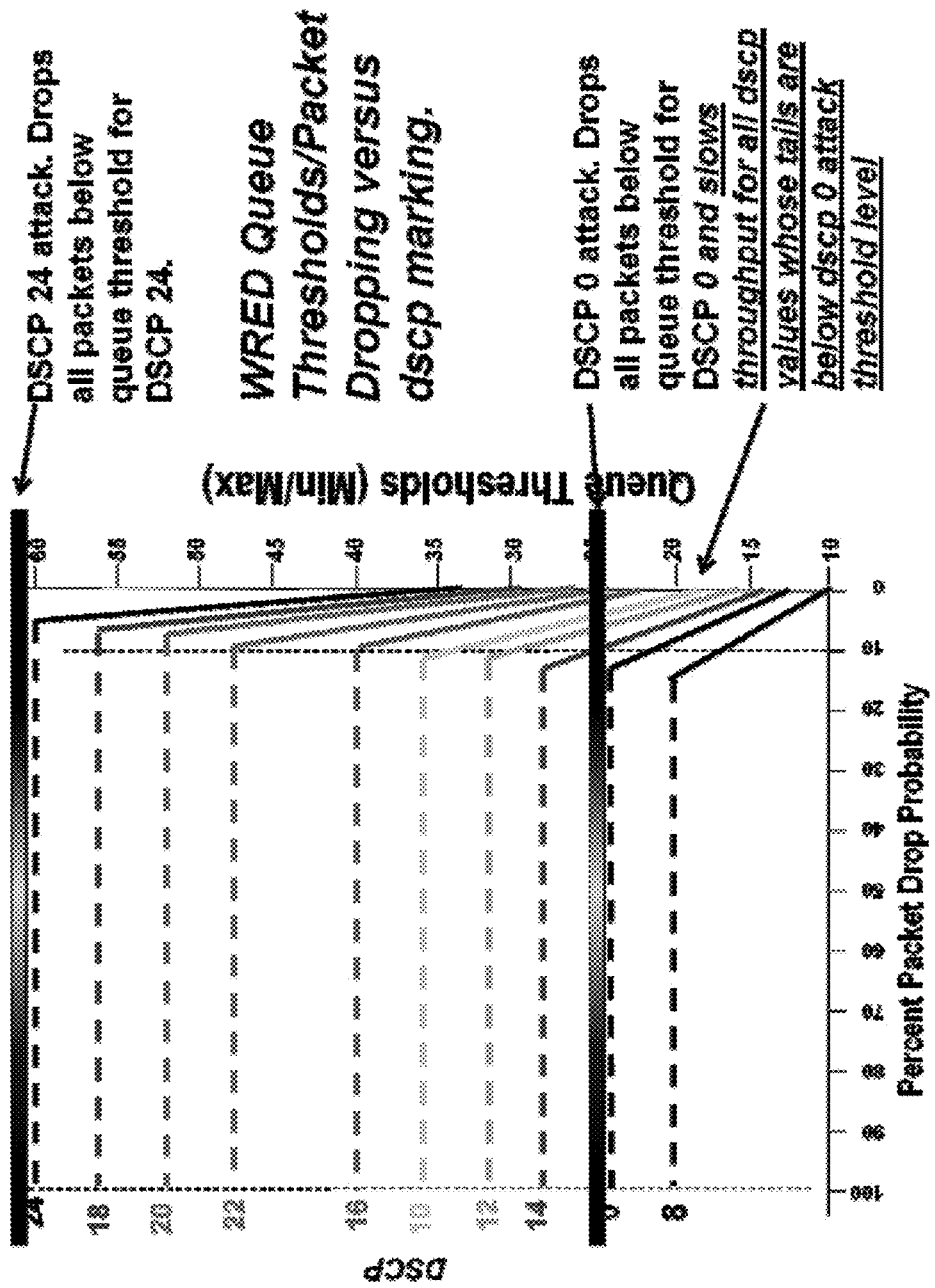
Figure 4  Example Priority Processing

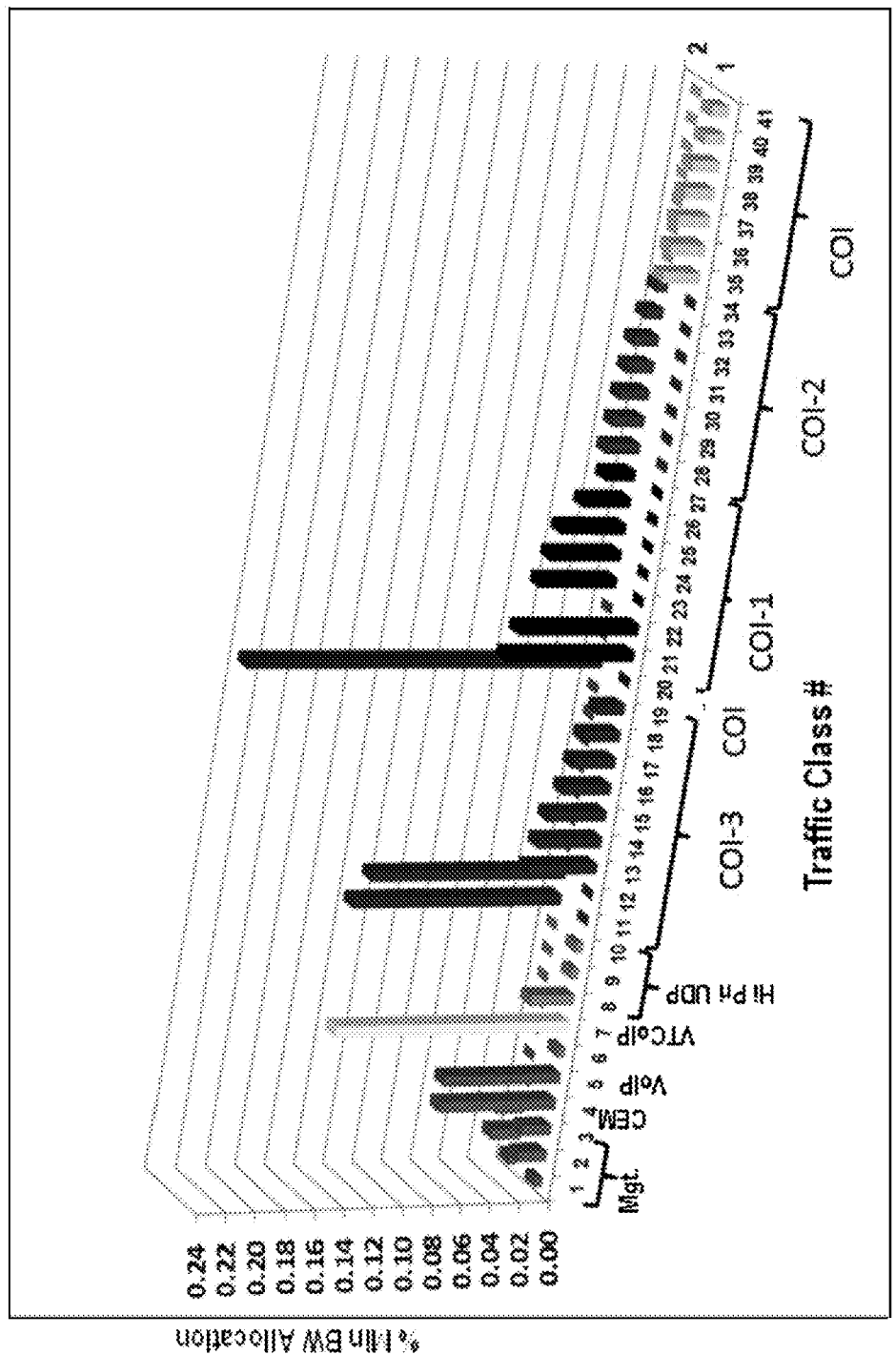
Figure 5    Dynamic Load Distribution

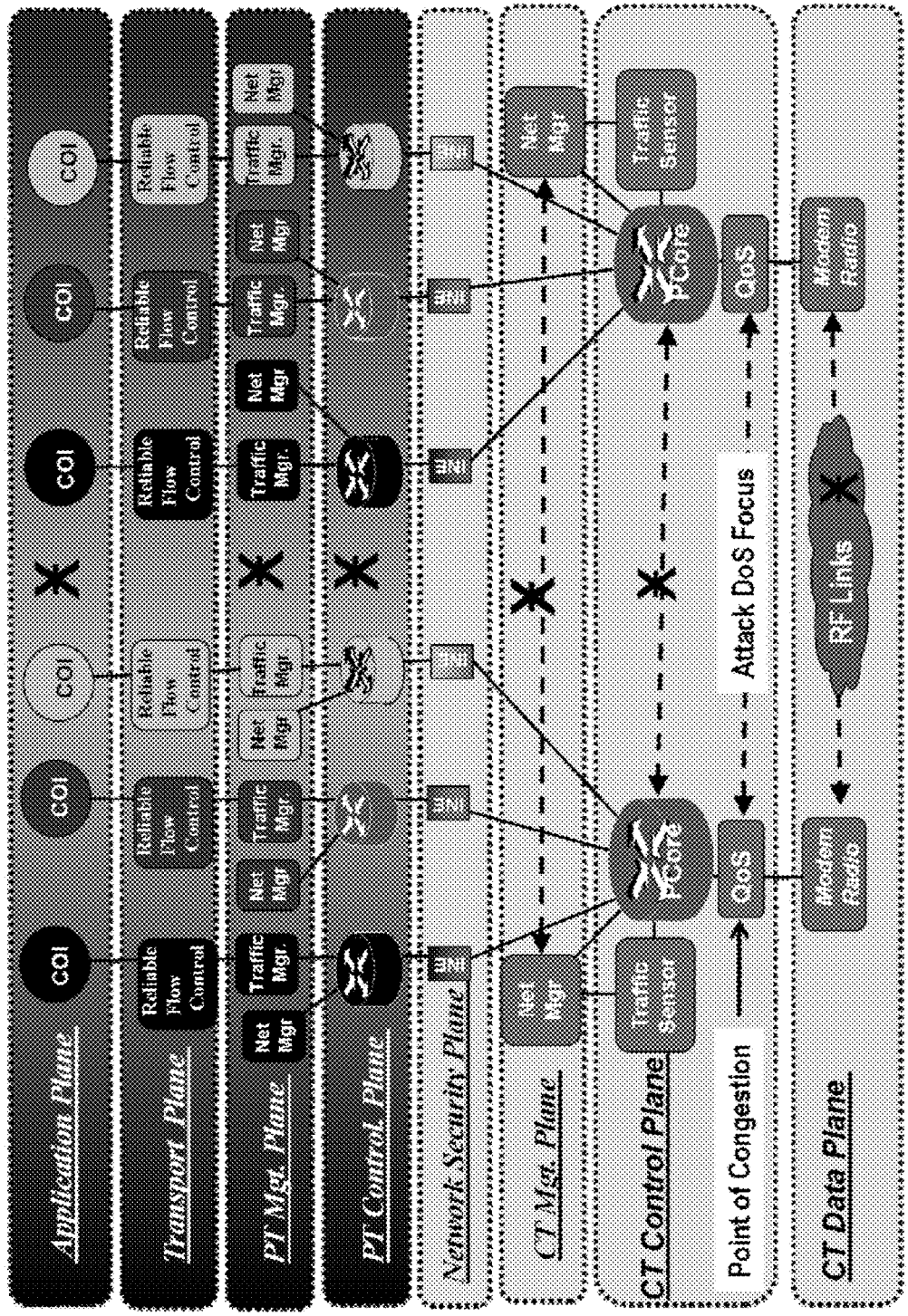
Figure 6  Network Planes

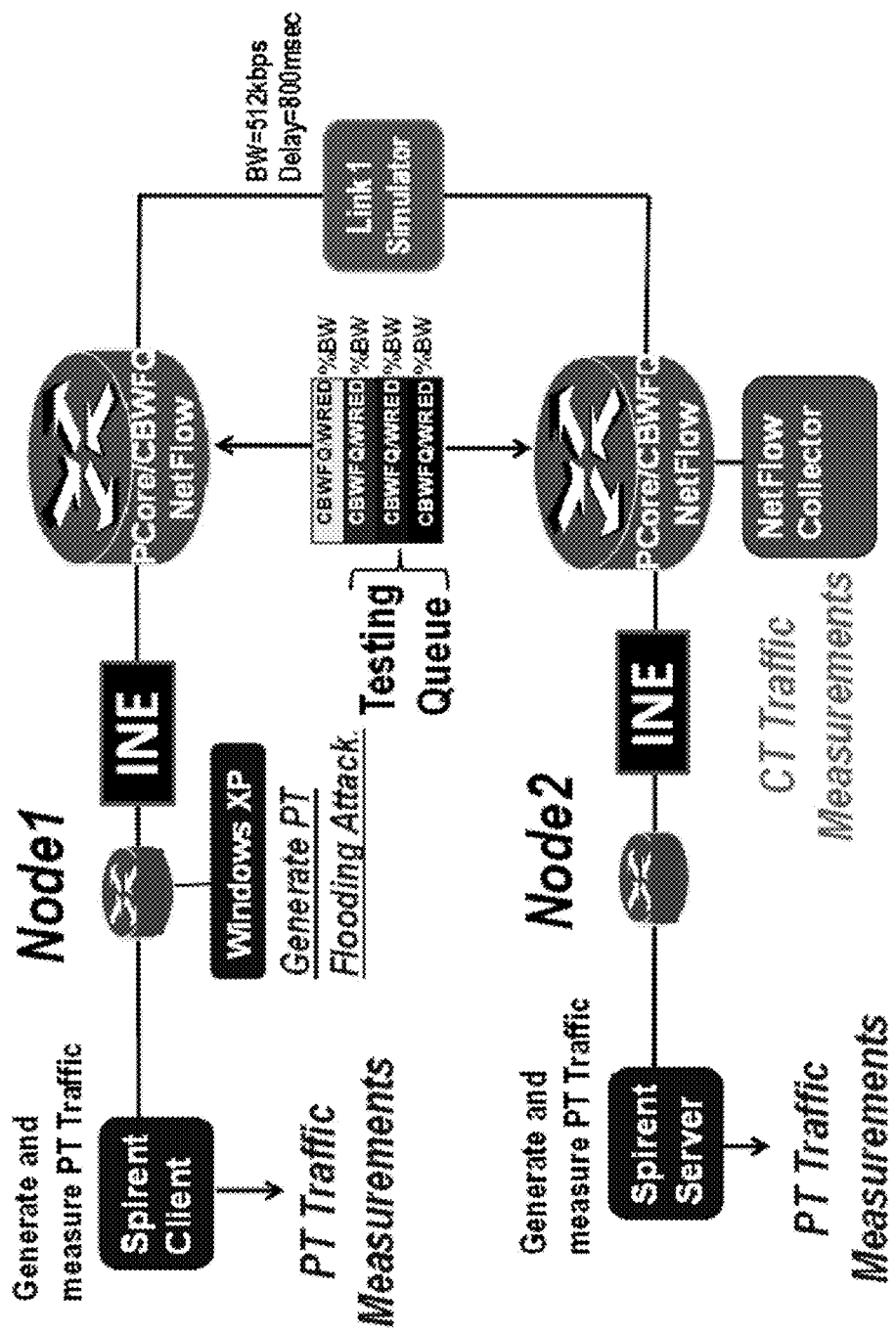
Figure 7    Test Node Configuration

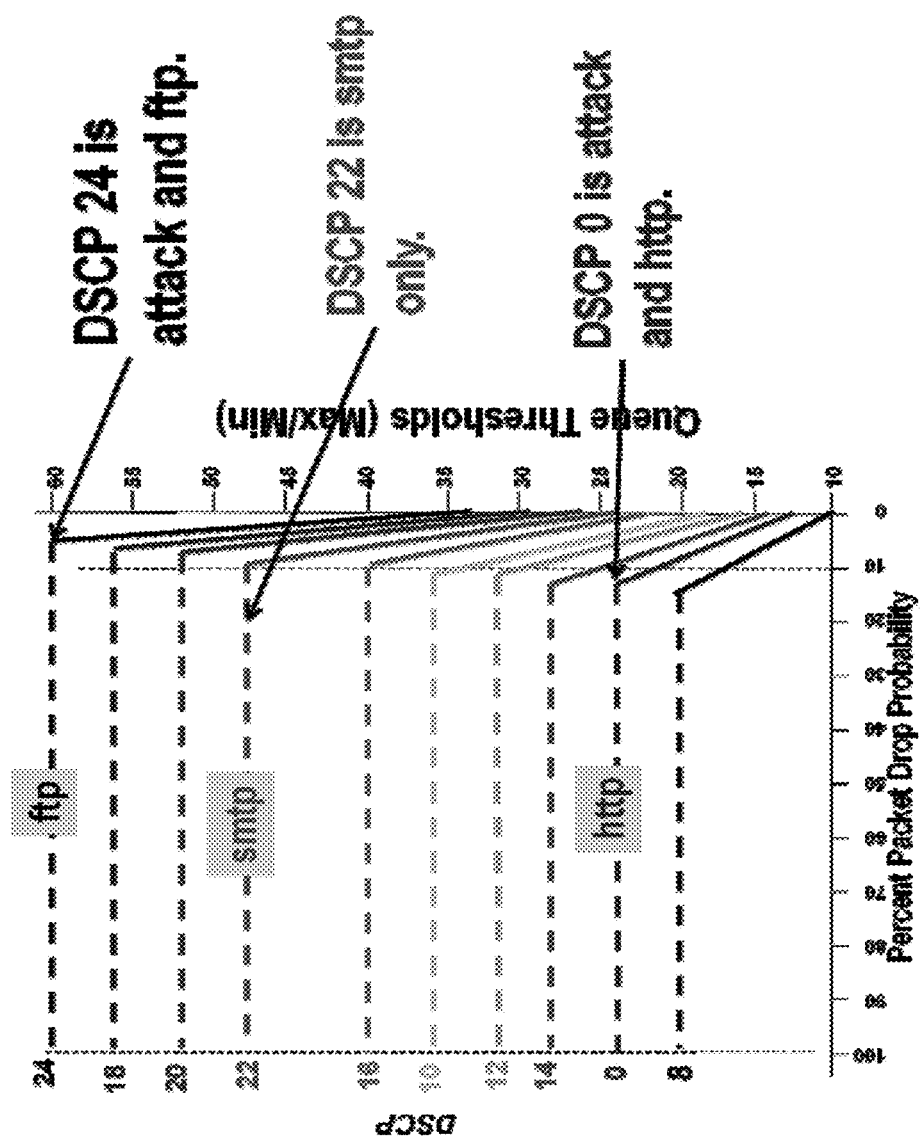
Figure 8  Test Traffic Class Marking with CBWFQ/WRED

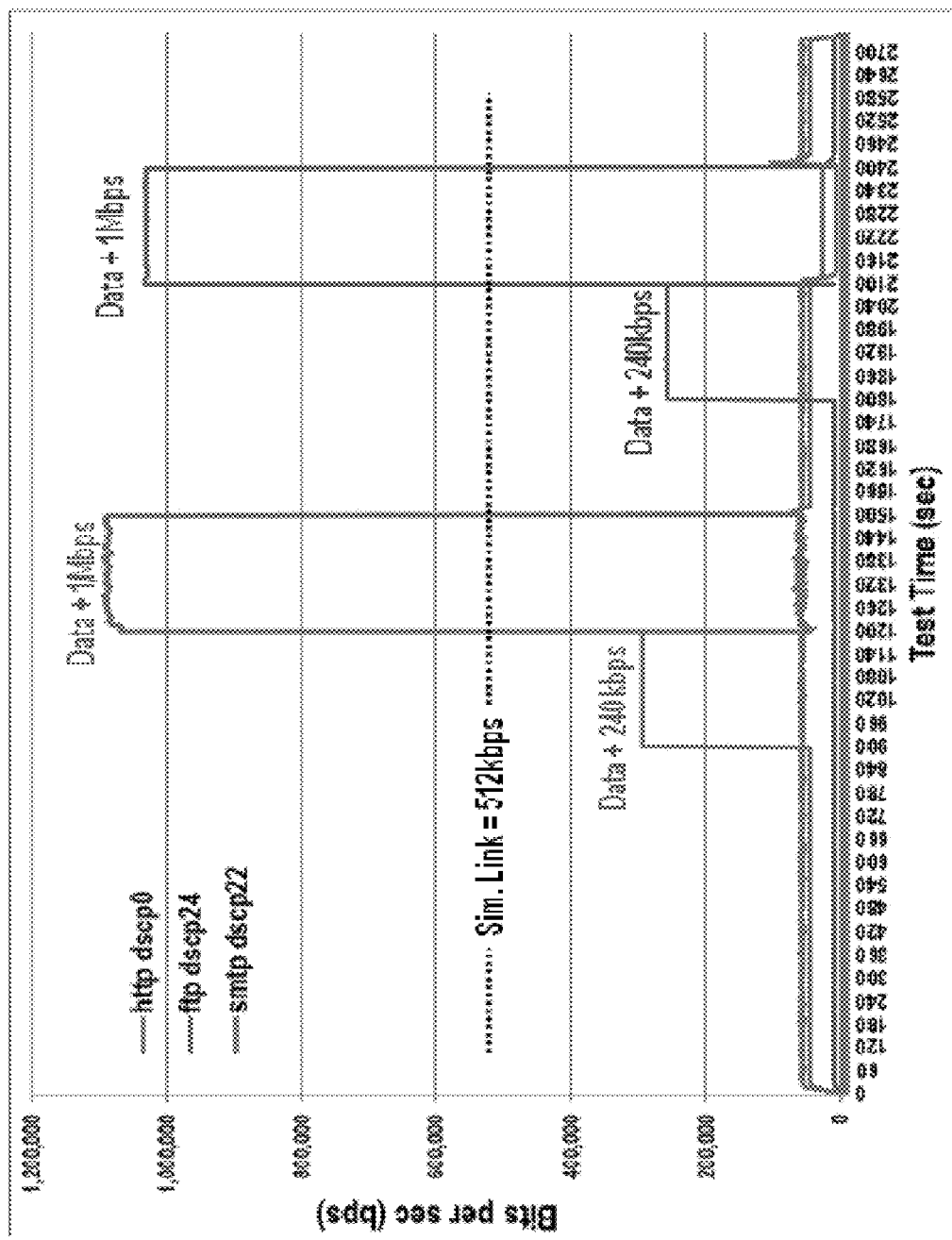
Figure 9   PT Traffic plus Attack loading

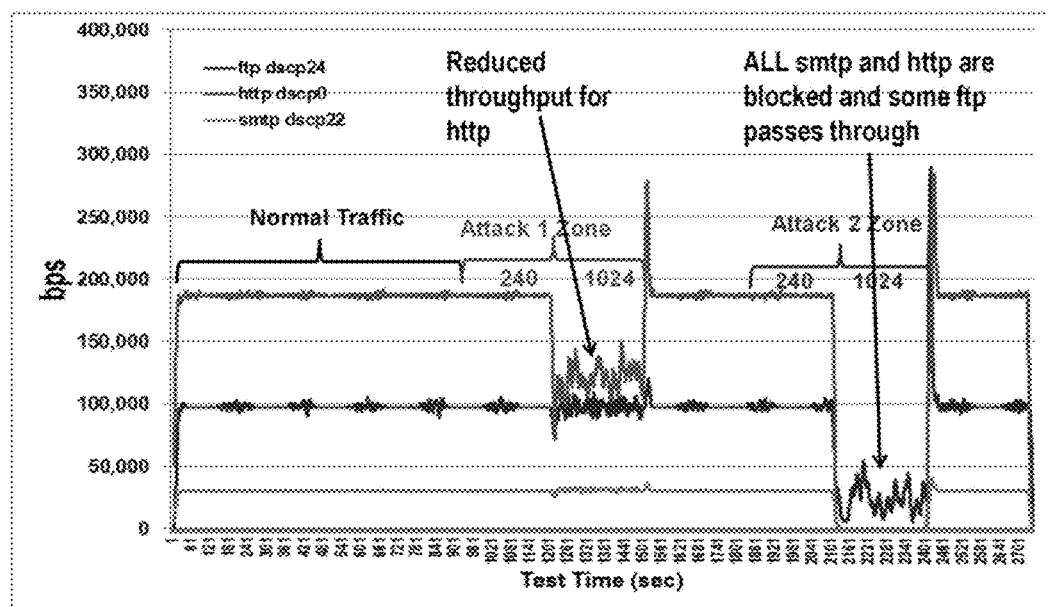
Figure 12 Attack Results on Throughput

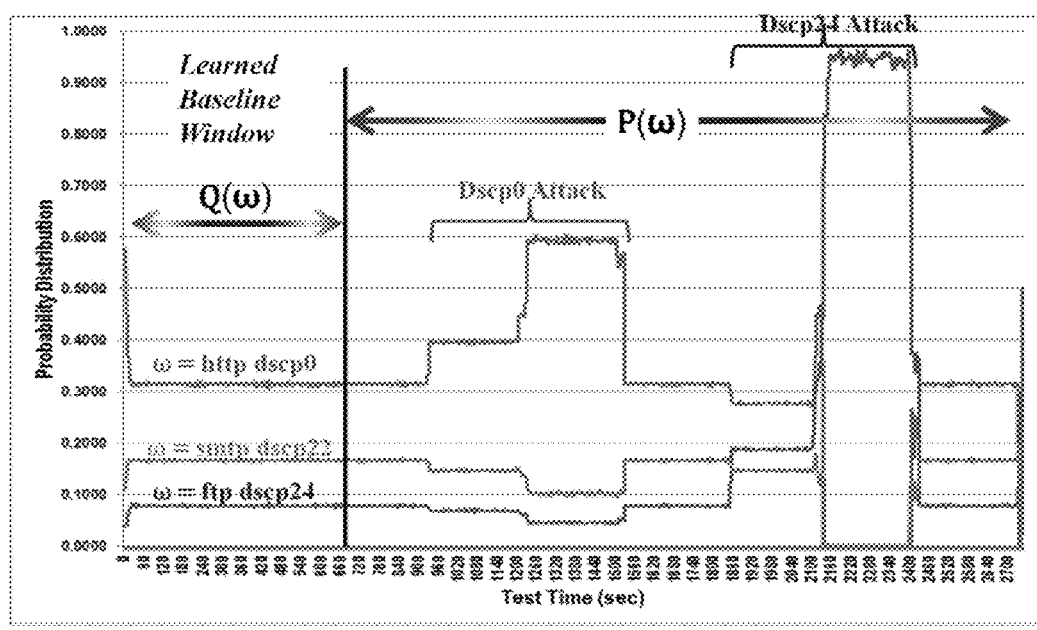
Figure 13 Probability Distribution

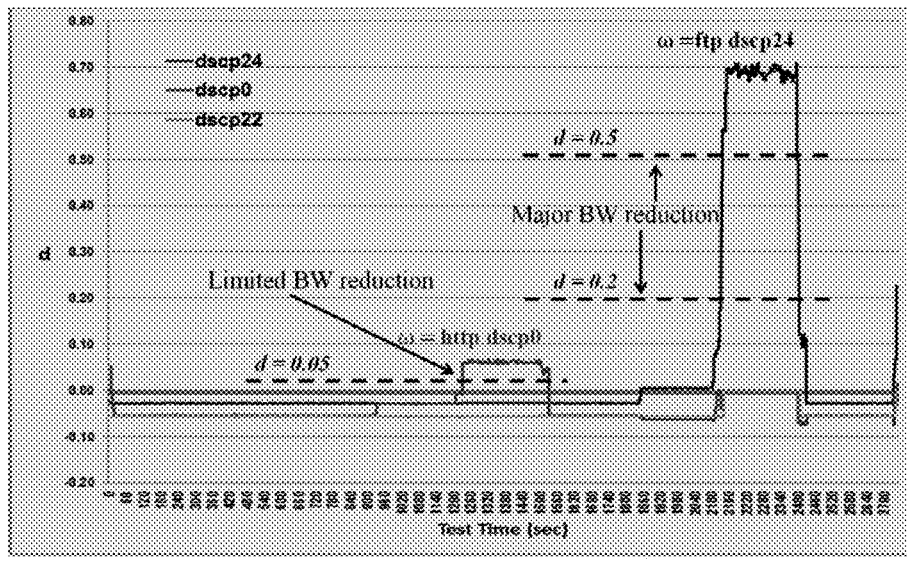
Figure 14  Baseline Calculation Options
Figure 15  Detection values

Figure 18    PT Traffic plus Attack loading (bps)

Figure 21  PT Probability Distribution

Figure 22  PT Threshold Detection Values

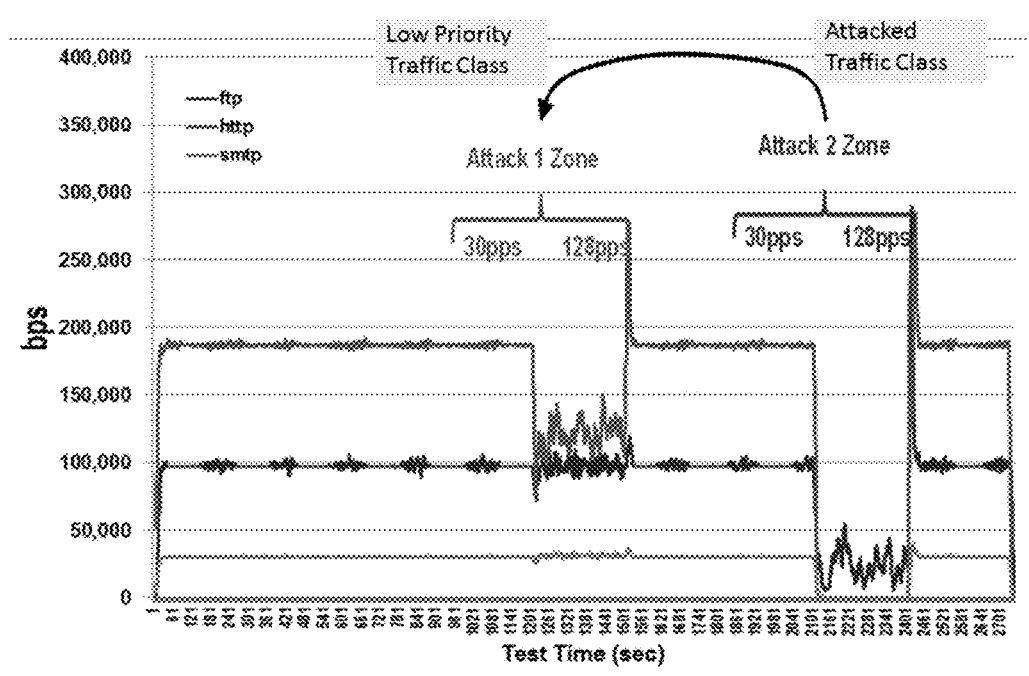
Figure 24  Attack Packet Remarking

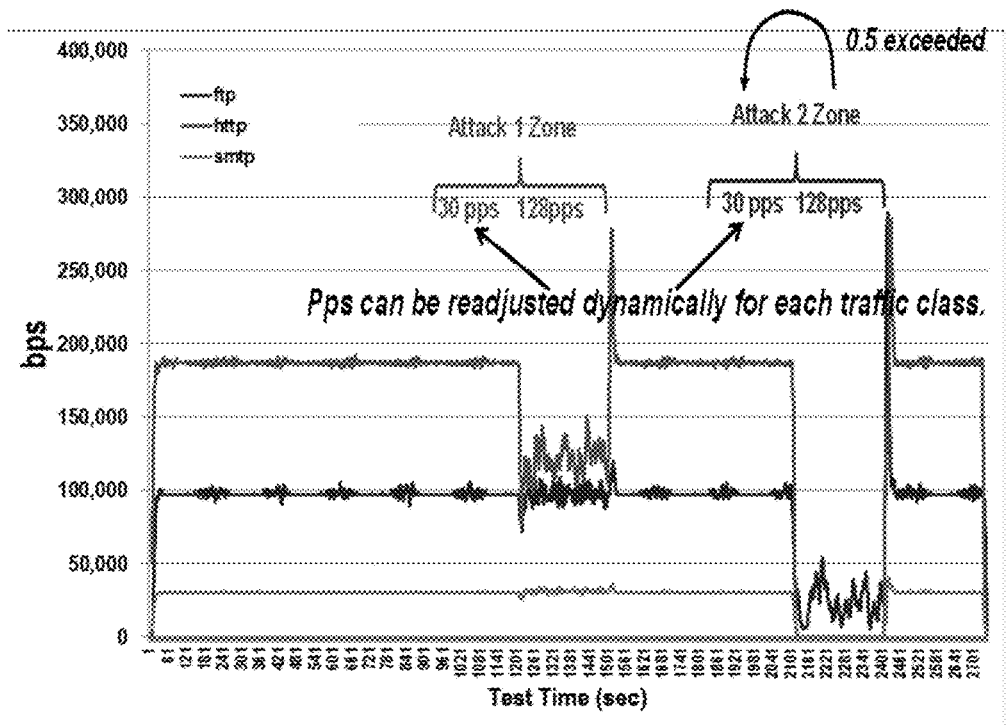
Figure 25  Attack Packet Policing
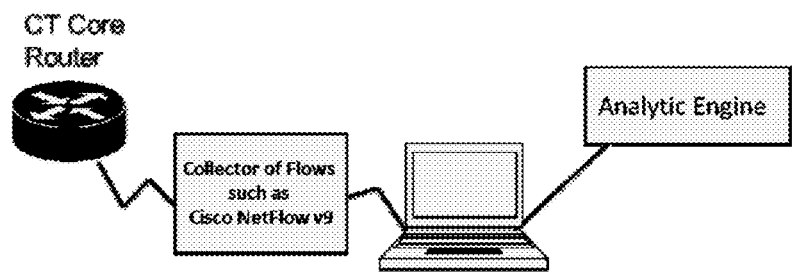
Figure 26  Graphic depicting the CT Analytic Engine

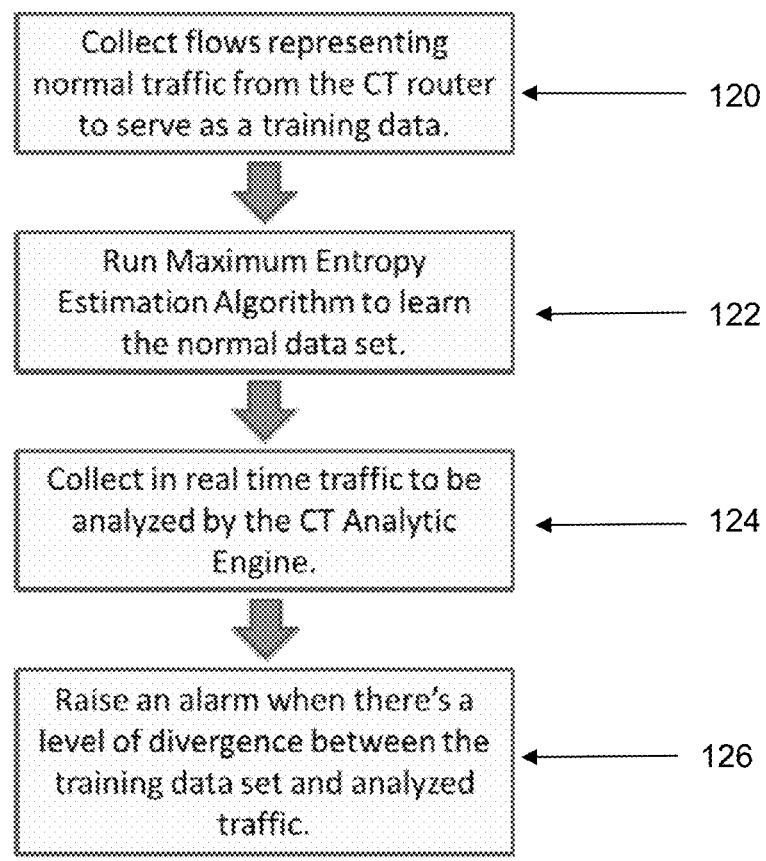
Figure 27  CT flow analysis steps

CYPHERTEXT (CT) ANALYTIC ENGINE AND METHOD FOR NETWORK ANOMALY DETECTION

FEDERALLY-SPONSORED RESEARCH AND DEVELOPMENT

This invention (Navy Case No. NC 101,610) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-2778; email T2@spawar.navy.mil.

BACKGROUND

In recent years network intrusion detection has become an important area for both commercial interests as well as academic research. Applications of network intrusion detection typically stem from the perspectives of network monitoring and network security. For network monitoring, characteristics such as flows which use a link with a given capacity, flow size distributions, and the number of distinct flows are of interest. In network security, attention is paid to characterizing known or unknown anomalous patterns of an attack or a virus.

Network Intrusion Detection Systems (NIDS) work by detecting malicious activity such as denial of service attacks, port scans or attempts to crack into computers. A NIDS reads all of the incoming packets and tries to find suspicious patterns known as signatures or rules.

Network Behavior Anomaly Detection (NBAD) Systems work by continuously monitoring the network for unusual events or trends. NBAD programs track critical network characteristics in real time and generate an alarm if an unusual event or trend is detected that could indicate the presence of a threat. Large-scale examples of such characteristics include traffic volume, bandwidth use and protocol use. In order for NBAD to be optimally effective, a baseline of normal network or user behavior must be established over a period of time. Once certain parameters have been defined as normal, any departure from one or more of them is flagged as anomalous.

Unfortunately the use of IPsec (Internet Protocol Security), which encrypts network traffic, renders network intrusion detection virtually useless unless traffic is decrypted at network gateways. One alternative to NIDSs are host-based intrusion detection systems (HIDSs) which provide some of the functionality of NIDSs but with limitations. HIDSs cannot perform a network-wide analysis and can be subverted if a host is compromised.

Many present day networks, including the Navy network, are moving towards the encryption of all traffic. For instance, a large portion of the Navy network is Type-1 encrypted. Currently available market/commercial products do not address a fully cyphertext network. They work by blocking application layer exploits, detecting HTTP specific attacks, employing deep packet inspection technologies and characterizing unencrypted flows.

Presently there are no industry/government solutions available to address the problem of cyber attack detection within fully encrypted network traffic where the problem is compounded by the scarcity of available parameters.

Industry also faces a problem when it comes to cloud computing and processing of encrypted packets. Their solution is Homomorphic Encryption, where a specific algebraic operation performed on the plaintext side is equivalent to another (possibly different) algebraic operation performed on the cyphertext side. Unfortunately Homomorphic Encryption does not address detection of cyber attacks on the cyphertext side of the network.

SUMMARY

In a cyphertext (CT) network, a method for detecting anomalies comprising analyzing cyphertext data flows within the CT network where the CT network includes one or more encryption devices for encrypting plaintext data packets into cyphertext data packets such that the cyphertext data flows are directed to one or more destination devices, where the cyphertext data includes multiple CT data packets and where each CT data packet includes header information where each header includes source address information, destination address information and differentiated service code point (DSCP) information representative of traffic class information; and analyzing the traffic class information of each header, including using maximum entropy estimation for detecting one or more anomalies within the traffic class distribution of each flow based on the header information for that traffic class.

BRIEF DESCRIPTION OF THE DRAWINGS

Throughout the several views, like elements are referenced using like reference characters, wherein:
FIG. 1 shows a CT/PT Domains Overview.
FIG. 2 shows a view of Traffic Class Definitions.
FIG. 3 shows Traffic Class Definition.
FIG. 4 shows Priority Processing.
FIG. 5 shows Dynamic Load Distribution.
FIG. 6 shows Network Planes.
FIG. 7 shows Test Node Configuration.
FIG. 8 shows Test Traffic Class Marking with CBWFQ/WRED.
FIG. 9 shows PT Traffic plus Attack loading.
FIG. 12 shows Attack Results on Throughput.
FIG. 13 shows Probability Distribution.
FIG. 14 shows Baseline Calculation Options.
FIG. 15 shows Detection values.
FIG. 24 shows Attack Packet Remarking.
FIG. 25 shows Attack Packet Policing.
FIG. 26 shows an embodiment of a CT Analytic Engine.
FIG. 27 shows a view of CT flow analysis steps.

DETAILED DESCRIPTION OF THE EMBODIMENTS

Figure 10:
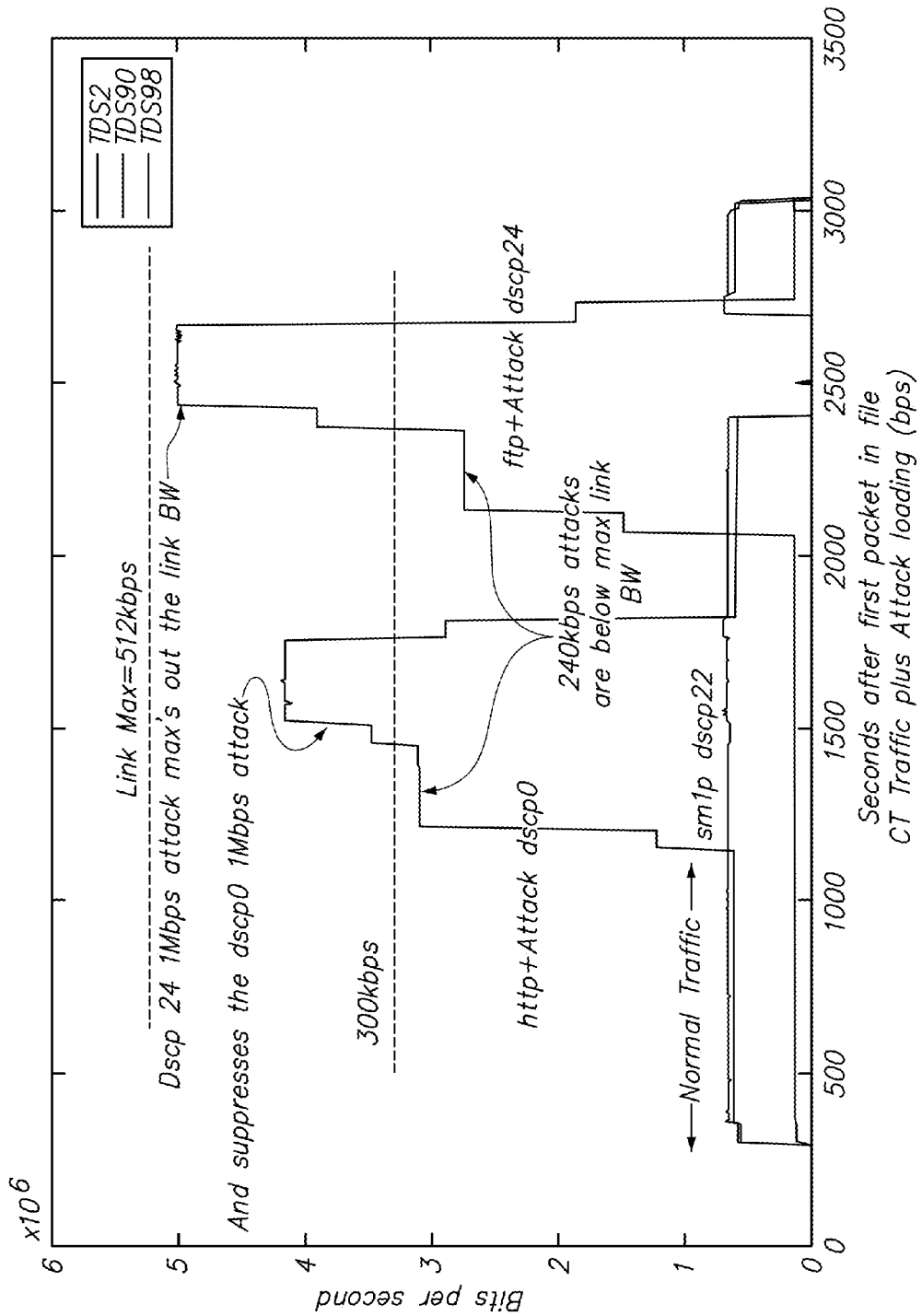
FIG. 10 shows CT Traffic plus Attack loading (bps).

A Cyphertext Analytic Engine and method is described for network attack and anomaly detection within, for example, Type-1 encrypted flows, where only a minimal amount of information is known about each packet/flow.

One embodiment addresses anomaly detection within a fully cyphertext network, where only a small portion of each header is revealed to display the source/destination address of the encryption device and the Differentiated Services Code Point (DSCP) related to Quality of Service (QoS) and precedence of the traffic, by using Maximum Entropy Estimation.

Cyber Network QoS Protection Architecture

1.0 Introduction

Defined is a Cyber network denial of service (DoS) defense strategy that focuses on wide area networks (WAN) using a Cyphertext (CT) protected core (PCore) routing domain where all application traffic is encrypted.

In the past the WAN designs for military use were based on maximizing the use of available link bandwidth in the face of network congestion. Today this process needs to be revaluated to also include designs that provide protection from cyber network denial of service attacks. Our focus is to assist the PT cyber-attack protection process by limiting the flow of attack packets in the WAN. The primary goal is to protect the quality of service (QoS) in the CT PCore provided to applications in the Plaintext enclaves.

The protected WAN architecture will provide a Cyphertext (CT) Core backbone security enclave. This requires all user data to be encrypted by a Type 1, National Security Agency (NSA) approved, Inline Network Encryptor (INE). To maintain protection of the Wide Area Network (WAN) routing domain, the Cyphertext routing architecture will be isolated from external routing domains.

A second requirement for network infrastructure intrusion protection is based on the DISA SECURITY TECHNICAL IMPLEMENTATION GUIDE's (STIG):

The Enclave STIG, V4R3 Dated 28 Jan. 2011
The Network Infrastructure STIG V7R0.1 Dated 9 Feb. 2007
The Network Intrusion Detection/Protection & Content Scanning Devices STIG V8R1 Dated 24 Mar. 2010

The Network Intrusion Detection/Protection & Content Scanning Devices STIG V8R1 states that "all DoD locations will install, maintain, and operate an intrusion detection and protection system (IDPS) inside of their network enclaves." The Enclave IDPS monitors the CT PCore internal network traffic and provides near real-time alarms for network-based intrusion/attacks.

Subsequent sections of this document define the dynamic QoS within a CT protected core (PCore) architecture which includes the protection functions, combined with the intrusion detection & response system necessary to defend against a network intrusion/denial of service attack.

2.0 Technical Description

An overview of the Plaintext (PT) and Cyphertext (CT) domains appears in FIG. 1. There are multiple PT community of interest (COI) enclaves operating at multiple security levels connected to a protected core (PCore) with inline network encryptors. These can be configured as multiple VPNs (Virtual Private Networks) accessing a service provider where the CT PCore is the service provider edge (PE) access point. The COI's share the available bandwidth across the PCore links. A traffic manager is used within each enclave to monitor enclave traffic flow and to set packet priority markings based on mission needs.

The entry into the CT PCore is a point of congestion. This is where QoS is critical to providing services for the multiple COI enclaves and hence this is where the attackers could focus their flooding denial of service attacks.

The attackers are assumed to have technical expertise and funding resources to make attacking traffic appear to be normal traffic without flow control. It is also assumed the attackers can plant attacks remotely which can be triggered by the attackers at any time. External flooding attacks received from other nodes would not consume bandwidth of the local nodes unless the received flooding traffic is to be relayed to another node. This could be an external attack plan, turn nodes into relays and saturate their bandwidth.

Dynamic QoS within the CT PCore consists of three dynamic functions that would be subject for packet flooding attack. These will be discussed in detail in the following sections A. Priority application processing within the PCore router queues.
B. Dynamic bandwidth allocation distributed over multiple PCore routing queues.
C. Dynamic load distribution over parallel paths.

Within the PT enclaves deep packet inspection is used to detect/protect multiple applications in each PT COI from various types of cyber-attacks. Cyber-attacks within the PT domain can be flooded into the CT domain.

Within the CT PCore where deep packet inspection is not possible, statistical detection and blocking of malicious traffic is necessary to protect the CT PCore QoS from denial of service (DoS) attacks.

2.1 Quality of Service (QoS) Description

Within this architecture we define dynamic QoS which means the QoS can dynamically change based on the mission needs of the COI enclave applications. The mission needs are set in the PT domain traffic manager by assigning DSCP priority markings to mission important traffic. This forms a "catch-22" situation in that the mission needs are not clearly defined and will change with operational scenarios. Passing congestion information is limited by the inline network encryption (i.e. IPsec) to the explicit congestion notification (ECN) bytes in the IP header. Therefore the goal for dynamic QoS is to be flexible to any change in operational needs and to be responsive to each normal traffic class while recognizing anomalous traffic classes attempting to degrade QoS.

(a) 2.1.1 Normal Traffic Class Definition

An example mapping for the COI enclaves is shown in FIG. 2. As shown in FIG. 2, a normal Traffic Class ($\omega$) within the CT PCore is based on combinations of each security enclave's source prefix (IPs), destination prefix (IPd), and Service Class DSCP values. Within the PT enclaves any application that has its packets marked with a particular DSCP value will become part of the CT traffic class with that dscp marking and that enclaves HAIPE IP addressing. There can be multiple PT applications in one CT traffic class. A traffic class ($\omega$) is the smallest defined flow in the CT PCore:

Where $\omega = (IP_s, IP_d, DSCP)$

FIG. 3 shows the range of application types and related DSCP. The left column defines the COI enclave originating the traffic classes. The center column defines the application types. The last two columns define the DSCP markings. The result is about 100 traffic classes within a single node when considering only the source IP address. When the destination IP address is used to further define traffic classes the number of traffic classes increases by the number of node destinations. For example 100 ships=10,000 traffic classes that must be managed. A cyber-attack on the PCore could flood malicious traffic using any traffic class markings that simulate normal traffic classes. An attacker could focus on traffic class markings that consume the most bandwidth.

2.1.2 Dynamic QoS

This section defines the three functions that support dynamic QoS and would be the focus of denial of service attacks.

2.1.2.1 Priority Processing

The $1^{st}$ aspect of dynamic QoS is priority processing as shown in FIG. 4. Priority processing is based on weighted random early detection (WRED). Packets are marked with a DSCP value by the traffic manager in the PT enclaves based on a mission needs application mapping. The PT traffic manager inspects packets to determine the required DSCP marking.

WRED is based on the random dropping of packets as the min threshold is reached. This causes TCP flow control in normal traffic to slow down. When the maximum threshold is reached all packets for that DSCP marking are dropped. A packet flooding attack (i.e. no TCP flow control) at the highest DSCP marking would cause all lower DSCP marked packets to be dropped.

2.1.2.2 Bandwidth Allocation

The $2^{nd}$ aspect for dynamic QoS is the % minimum bandwidth (BW) allocation assigned to every COI enclave/traffic class within the PCore router. The sum of all the BW allocations should be about 95% of the link BW. Within each COI enclave's CBWFQ, the BW is further divided using WRED priority processing. The actual BW used by each traffic class is dependent on how many traffic classes are being used and the actual link BW. When a traffic class stops sending traffic, its BW allocation is dynamically redistributed to other traffic classes based on their relative % BW allocation.

One key issue is that the dynamic BW redistributions, based on normal traffic class flows, must be considered when establishing detection thresholds for anomalous traffic. The increase in normal traffic due to redistribution should not be detected as anomalous traffic.

2.1.2.3 Load Distribution

The $3^{rd}$ aspect for QoS is dynamically redistribution of the traffic classes over parallel paths to maximize use of all available bandwidth. Normal routing protocols will only select the lowest cost link and leave any parallel links empty. Multi topology routing (MTR) can be used to policy route selected traffic over parallel paths. However MTR does not dynamically switch paths based on link loading. A dynamic redistribution approach requires some method for measuring traffic flow. This will improve the redistribution efficiency but does open the door to potential cyber disruption.

One of the new load distribution protocols is Cisco's OER/PfR. OER/PfR uses a NetFlow measure of % bandwidth utilization per traffic class to policy base shift traffic classes between the parallel paths. An example in one time period of OER/PfR is shown in FIG. 5. In this example there are two parallel links (i.e. row 1, SHF and 2, CBSP). In both links the BW is fully loaded. As can be seen the BW used by each traffic class can have a large variation depending on how OER/PfR redistributes the traffic classes.

Setting thresholds for anomalous traffic detection must consider load distribution variations on throughput. The actual throughput for each traffic class is limited by TCP for normal traffic but attacking traffic has no flow control limits. This is an advantage for detecting anomalous traffic which can have a flow much greater than normal TCP traffic flow.

2.2 Network Planes

Network planes are shown in FIG. 6. The Application Plane is where the application traffic classes are originated. The PT Mgt. Plane is where DSCP markings are added to applications to form traffic classes. The Traffic Mgr. is also use by node managers to set the traffic flow based on mission needs.

The management plane handles administration, configuration, booting, and generally the persistent state of the router. The control plane covers monitoring, route table updates, and generally the dynamic operation of the router. A separate control plane exists for the CT core and each PT routing domain.

The security plane handles the INE management functions including discovery service, ESP header protection, sync/sequence numbering, and IKE. The data plane handles the packets transiting the router among the networks it serves.

In FIG. 6, potential DoS flooding attack injection points are marked by a "X". The attack in this document is focused on disrupting QoS and is shown in the CT control plane at the point of congestion. Within the CT PCore there can also be attacks on the routing protocols, the net mgr. the network security and routing reachability advertisements in the PT control plane. These types of attacks can be solved by using IPsec in the basic network design and are assumed to be in place in this document.

2.3 Attack Test Results

Considerable testing has been conducted to measure the impact of a packet flooding attack on the PCore QoS. This section presents a summary of the testing.

Within each traffic class there can be multiple applications using the same dscp marking. For example the normal traffic in the attack testing had multiple ftp sessions using the same dscp marking.

The test configuration is shown in FIG. 7. The simulated link was set at 512 kbps and a 800 msec delay to simulate a Satcom link. Spirent was used to generate multiple http, ftp and smtp sessions. The Spirent in node 1 was configured to act as a client requesting service from the Spirent Server in node 2. The attack was generated in Win XP and injected into the PT router. The attack was 1000 byte packets flooded with no flow control. The attack was also injected in the CT PCore router with the same test results.

The following test results were with the attack located on the client side as shown in FIG. 7. The impact of this location is that when the attack blocks all client requests, the server sends nothing. If some client requests leak through the server will attempt to set up TCP connections which causes TCP instability.

Testing was also conducted with the attack located on the server side in node 2. In this case the client keeps sending requests but the server responses are block by the attack. The end result for the high priority attack is the same.

WRED packet processing is shown in FIG. 8. The ftp sessions are mixed with the attack packets to determine the impact when normal traffic is competing with attack traffic. The ftp traffic will slow down due to TCP back off from dropped packets. The attack packets will also be dropped but not slowed down. The expected result would be all traffic below dscp24 will be dropped and normal ftp dscp24 traffic will be significantly reduced.

For the packets marked dscp0 normal http dscp0 packets will have reduced bandwidth. Packets higher than dscp0 will have some tall dropping and should have a small reduced throughput.

FIG. 9 shows the data plus attack packets inserted in the PT enclave. The attack was set in two levels. The first (240 kbps) was below the simulated link bandwidth to determine the bandwidth reduction impact on normal throughput. The question was, is the bandwidth reduction significant for the low level attack enough to raise an attack detection alarm.

The second attack level (1024 Mbps) was twice the simulated link bandwidth to determine the amount of normal traffic blocked by the attack packets.

FIG. 10 shows the packets actually injected into the CT link as measured by NetFlow. The dscp24 attack packets were limited in the PCore router queue to the max link bandwidth and the dscp0 attack packets where further limited by normal traffic with higher dscp markings.

Figure 11:
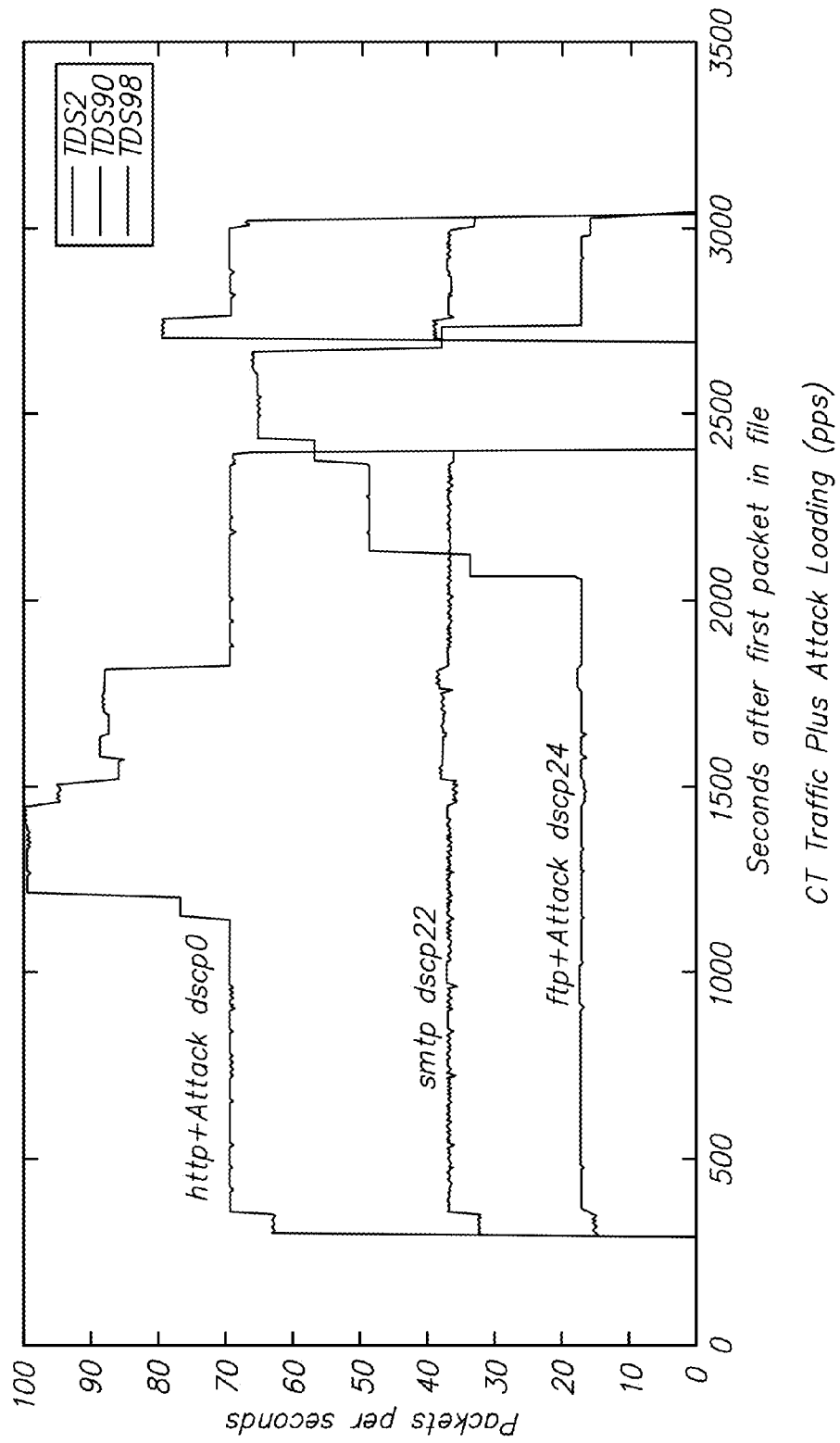
FIG. 11 shows CT Traffic plus Attack loading (pps).

FIG. 11 shows the same traffic shown in FIG. 10 except it is in packets per sec (pps) instead of bits per sec. The pps measurement does not consider packet size where bps is dependent on packet size. Applications with small packets will have a higher pps count than the attack packets which are set at 1000 bytes. The pps measurement is what is used to measure/compute traffic statistics for attack detection.

The result of these attacks on bps throughput is shown in FIG. 12. The 240 kbps attacks had minimal impact on normal traffic throughput. The dscp0 1024 kbps attack reduced the normal dscp0 traffic throughput and had minimal impact on throughput for higher dscp marked traffic. The major impact was the attack packets marked dscp24 blocked all normal traffic with lower dscp markings and reduced normal dscp24 traffic by about 80%. This suggests that if attack traffic can be limited to about 50% of the link bandwidth the attack disruption can be significantly reduced.

2.4 Detection and Response

Detection and Response against traffic flow disruption within a Cyphertext network domain can be described as follows.

Detection
1. Need to reliably identify that an attack is taking place, disrupting QoS and consuming significant enclave bandwidth
2. Need to identify the source of the attack
3. Need to define a detection threshold approach for reliable identification and a set of alarms for multiple levels of attack Response
1. Need to provide varying levels of response to disruption of QoS and bandwidth consumption based on severity of alarms
2. Need to focus response on source of attack
3. Need to prevent dynamic load distribution from redistributing the Cypher network attack (b) 2.4.1 Detection The first step is to convert measured pps, as shown in FIG. 11, to a Probability Distribution $P(\omega)$ which will be used in the detection process. The probability distribution parameters are:

$Q(\omega)$=learned Baseline Prob. Dist. per traffic class $\omega$
$P(\omega)$=current measured Prob. Dist. Per traffic class $\omega$
$P(\omega))=pps(\omega)/\Sigma\ pps(all\ \omega)$
Where $pps(\omega)$=packets per sec per traffic class $\omega$
And $\Sigma\omega\ P(\omega)=1$ It should be noted that at any instance of time the sum of the probability distribution for all traffic classes will equal 1. The higher probability distribution value for a traffic class increases the likelihood of successful detection for that traffic class.

As seen from FIG. 13 the dscp0 traffic class attack does not significantly suppress the higher priority smtp and ftp traffic classes which limits the dscp0 attack $P(\omega)$. The dscp24 high priority attack does suppress the lower priority http and smtp applications which allows the dscp24 attack to significantly increase its $P(\omega)$ and hence its likelihood for detection.

Attack detection is a method for comparing the current measured traffic $P(\omega)$ against an established baseline for normal traffic $Q(\omega)$. The baseline for measuring $Q(\omega)$ is shown as the first 666 secs of the test time. The actual operational baseline learning window would be variable over time with the goal of developing a reliable baseline without attack corruption.

Potential formulas for exponential weighted moving average (EWMA) baseline update for $Q_n$ are based on:

$$Q_n = \alpha \times P + (1-\alpha)Q_{n-1}$$

Where
$Q_n$=New Predicted Baseline
P=Measured
$Q_{n-1}$=Old Baseline

Some options for calculation of new baseline constructed from an n number of old baselines are depicted in FIG. 14.

Formula used for past baselines to form new baseline for these test results is:

$$Qn = \frac{2^{n-1}}{2^n - 1}P + \frac{(2^{n-1} - 1)}{2^n - 1}Q_{n-1}$$

Other embodiments could include additional formulas and/or sampling techniques that can detect normal baselines during attacks.

To establish statistical thresholds Maximum Entropy Estimation has been adopted for the initial investigations. Refer to a following section which references Maximum Entropy Estimation.

Maximum Entropy estimation is for obtaining a parametric probability distribution model from training data and a set of constraints which produces a model with the most 'uniform' distribution among all the distributions satisfying the given constraints. A mathematical metric of the uniformity of a distribution P(o) over a set of traffic classes is its entropy:

$$H(P) = -\sum_{\omega \in \Omega} P(\omega)\log P(\omega)$$

Maximizing the likelihood of the distribution with respect to $P(\omega)$ is equivalent to minimizing the Kullback-Leibler (K-L) divergences of $P(\omega)$ with respect to $Q(\omega)$. For each traffic class $\omega$ in our model we check for anomalies by comparing the baseline distribution $Q(\omega)$ to the empirical distribution $P(\omega)$.

We then calculate a Maximum Entropy Detection Value d $$d = P(\omega)\log\frac{P(\omega)}{Q(\omega)}$$

The goal is to establish a range of detection threshold values ($d_{Tn}$) that are used to trigger alarms when the measured $P(\omega)$ is compared against the learned baseline $Q(\omega)$ and $d > d_{Tn}$ has occurred.

The $d > d_{Tn}$ measurement is based on a number (h) of time bins $w_{tb}$ within a measurement time window W. An alarm is sounded when d exceeds a specified detection threshold value ($d_{Tn}$) h times during time window W where h is the confidence factor.

FIG. 15 shows detection values d from the probability distribution shown in FIG. 13. As can be seen the high level dscp24 attack can be detected with detection thresholds set at 0.5. Attacks that cause less loss of QoS/BW are not detected until the threshold is set below 0.05.

Figure 16:
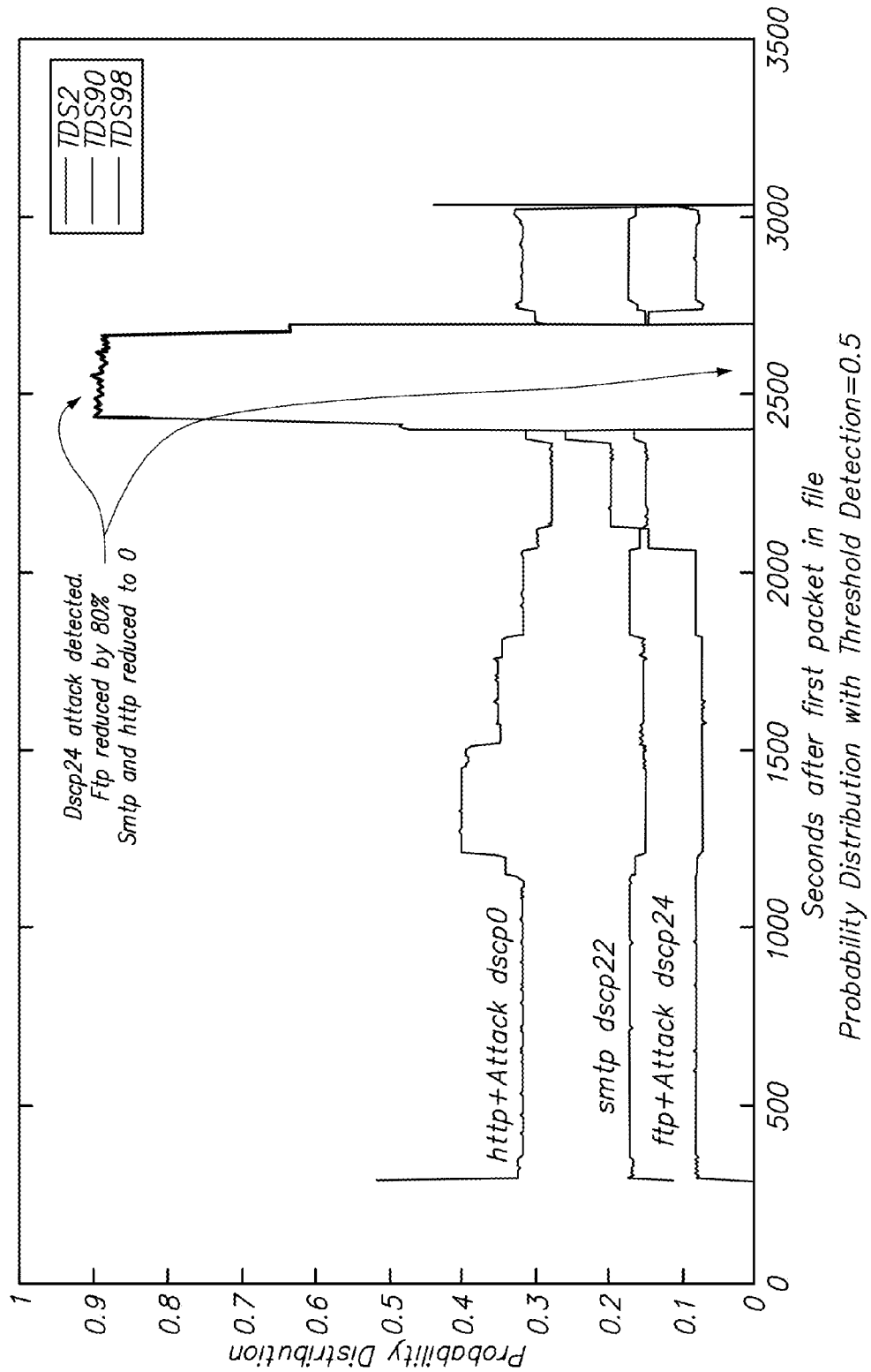
FIG. 16 shows Probability Distribution with threshold detection=0.5.

FIG. 16 shows the probability distribution in the CT domain with the threshold detection=0.5.

Figure 17:
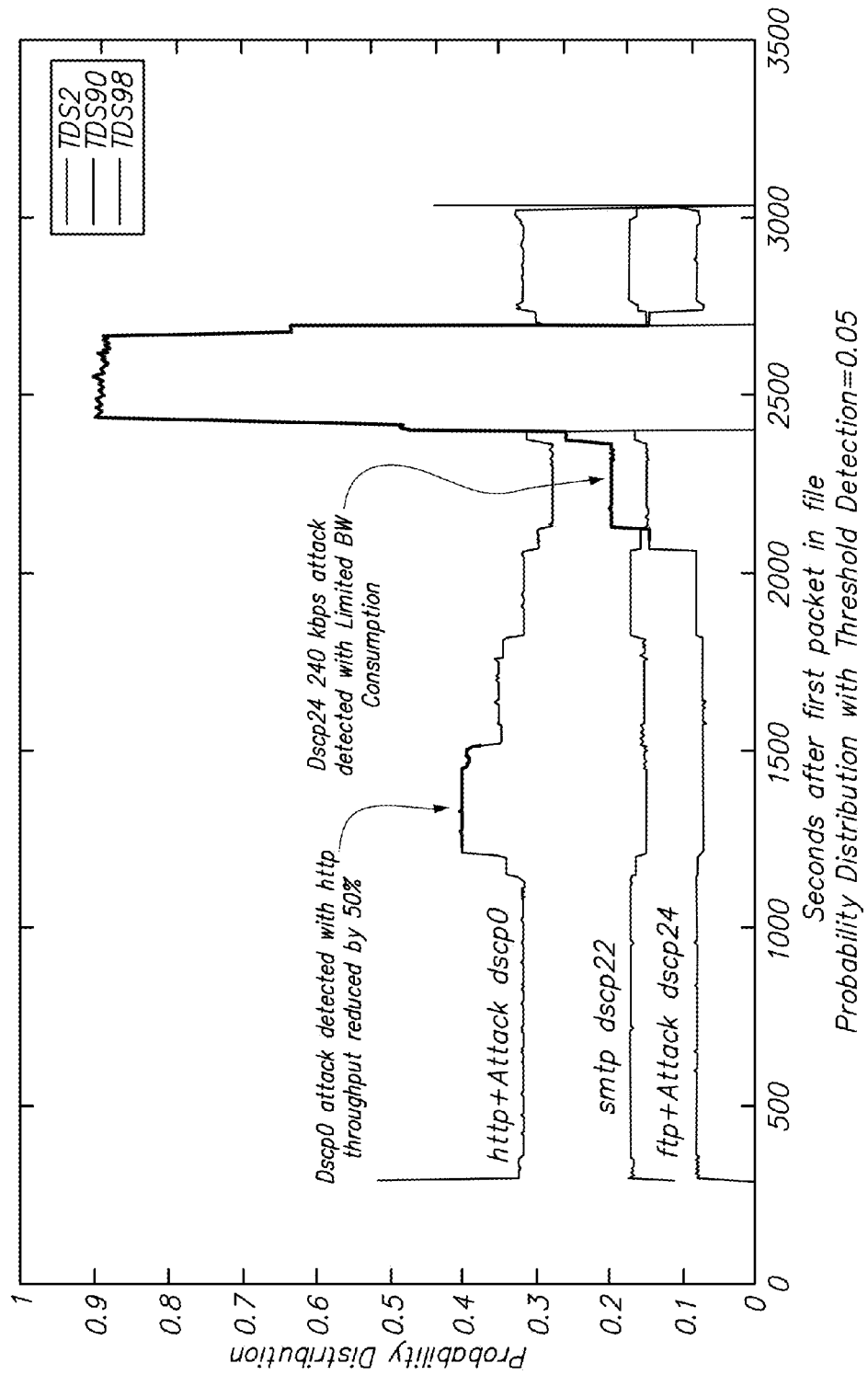
FIG. 17 shows Probability Distribution with threshold detection=0.05.

FIG. 17 shows the probability distribution with the threshold detection=0.05. It can be seen that threshold detection at this low level will set alarms for attack traffic that has minimum impact on QoS.

Figure 18:
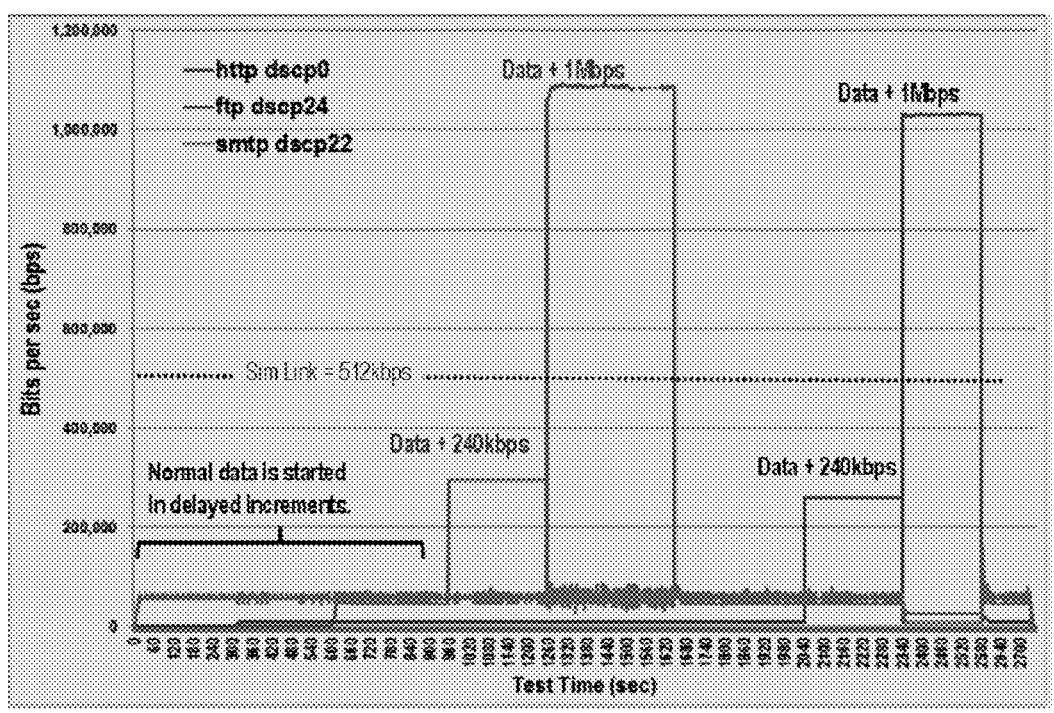
FIG. 18 shows PT Traffic plus Attack loading (bps).

A second test was conducted to determine the impact on $Q(\omega)$ of variable normal traffic loading in delayed time increments. The traffic flow for normal and attack in bps is shown FIG. 18 for the PT domain.

Figure 19:
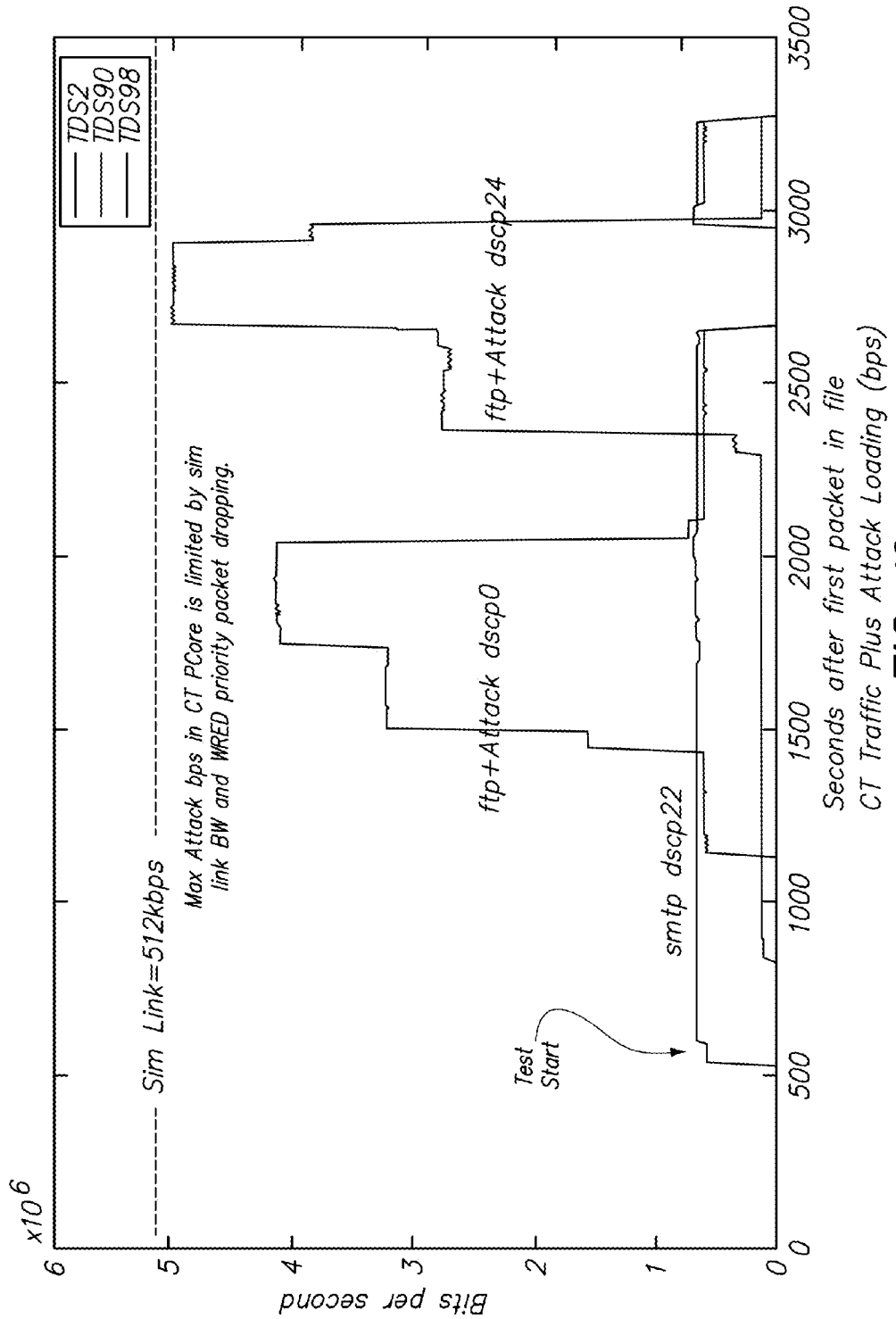
FIG. 19 shows CT Traffic plus Attack loading (bps).

The attack bps in the CT PCore is shown in FIG. 19.

Figure 20:
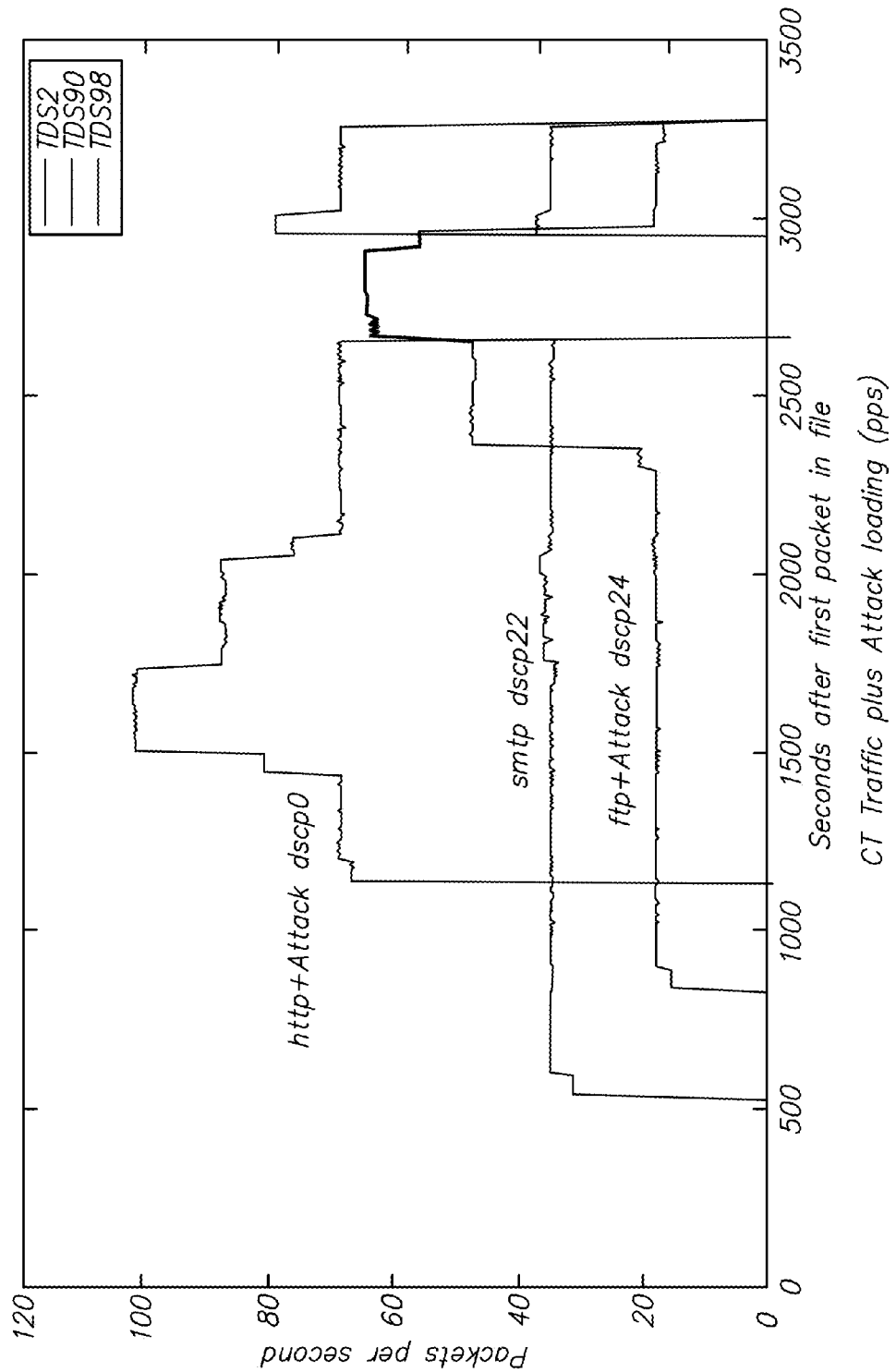
FIG. 20 shows CT Traffic plus Attack loading (pps).

FIG. 20 shows the same traffic shown in FIG. 19 except it is in packets per sec (pps) instead of bit per sec. The pps measurement does not consider packet size where bps is dependent on packet size.

Figure 21:
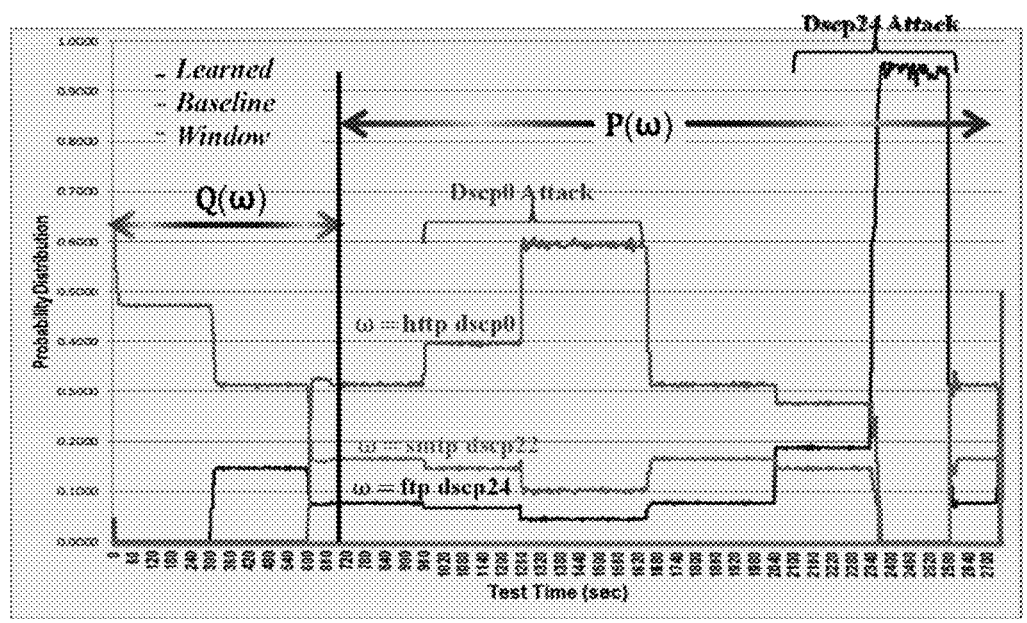
FIG. 21 shows PT Probability Distribution.

The conversion of pps to a PT probability distribution is shown in FIG. 21. As can be seen the baseline learning window has normal traffic with variable levels and start times. The late start time for the dscp0 traffic class means the baseline $Q(\omega)$ averaged over the learning window for dscp0 is going to be much smaller than the real normal traffic. The goal is to measure the impact on threshold detection d.

Figure 22:
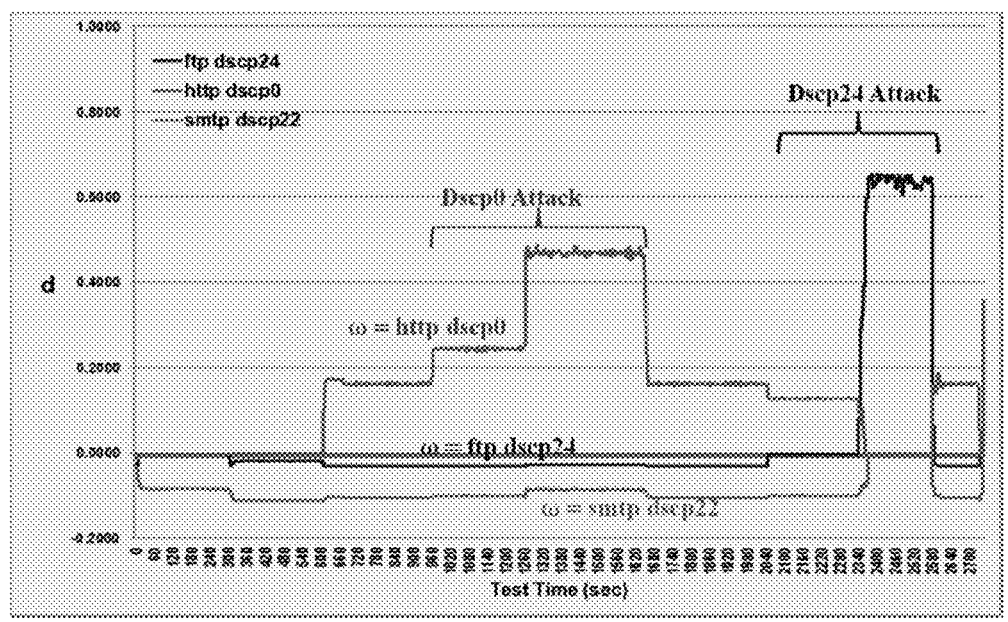
FIG. 22 shows PT Threshold Detection Values.

FIG. 22 shows that a lower measures baseline for the dscp0 attack raises the detection value d to just below 0.5. The detection value for the dscp24 attack is over 0.6.

Figure 23:
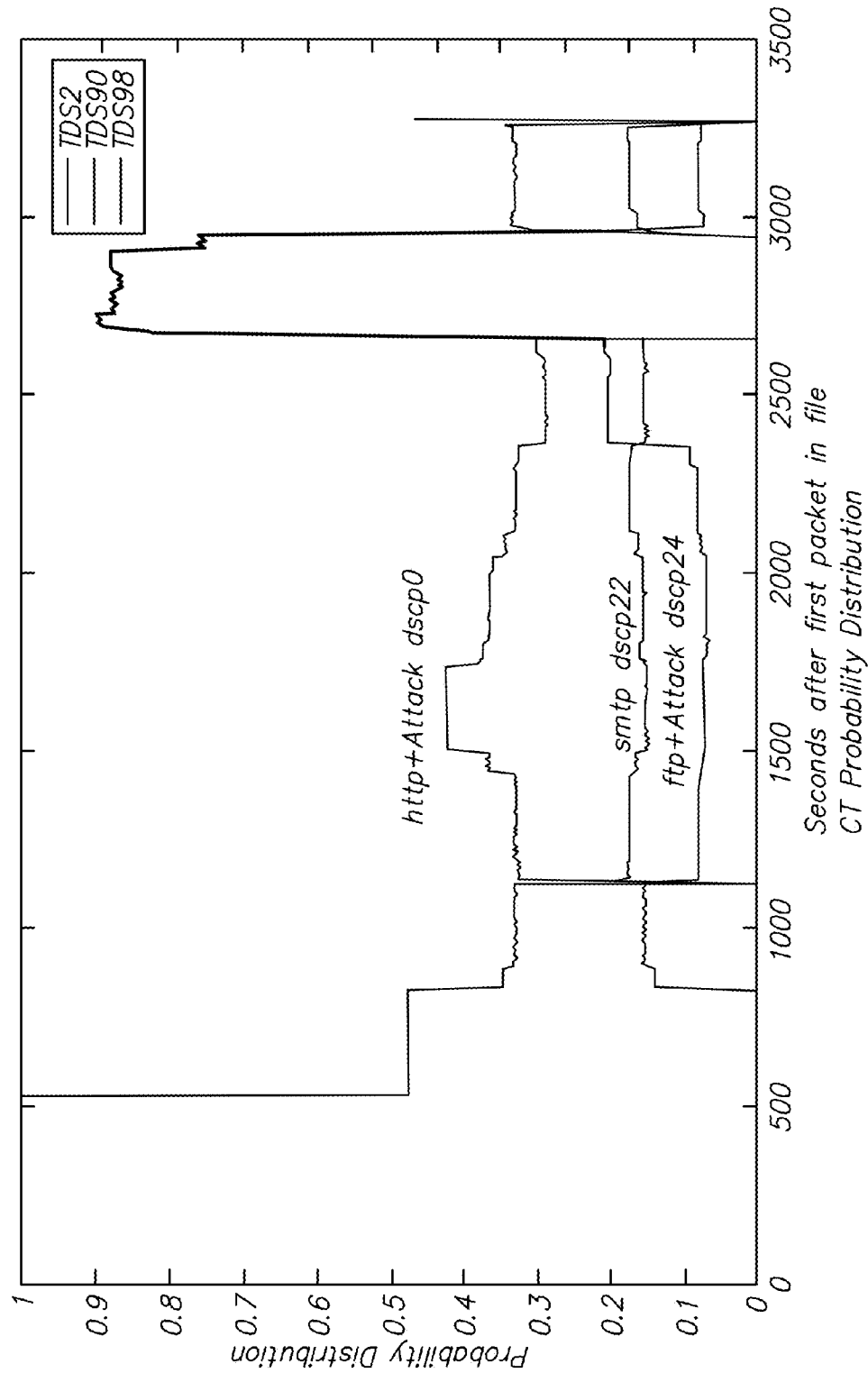
FIG. 23 shows CT Probability Distribution.

FIG. 23 shows the probability distribution and the 0.6 thresh detection level measured in the CT PCore. Within the CT PCore the actual dscp0 traffic is reduced by CT router queuing which would reduce the dscp0 detection values shown in FIG. 24. The result of the new baseline learning is that a high threshold in the 0.5-0.6 range still successfully detects dscp24 attack traffic (c) 2.4.2 Attack Response The response to a flooding DoS attack should be to identify the source of the attack and then limit the attack's impact on the dynamic QoS. The response would be implemented when the threshold value was exceeded. Exemplary response options are:

Option 1; Remark Packets

A first option, shown in FIG. 24, is to remark all packets from the attacking source IP address in the CT router to dscp0 if they exceed the detection threshold of 0.5. This does not eliminate the bandwidth reduction but does limit it to the lowest priority traffic.

Option 2; Policing Attack

A second option, shown in FIG. 25, is to police (monitor network traffic) all dscp24 traffic class traffic in attack 2 that exceeds the threshold detection 0.5 to <30 pps. Actual value needs additional testing. Policing only applies to the attack source IP address.

This option could be implemented for all traffic classes based on their expected throughput within the CT PCore router. This would eliminate the need of threshold detection but may unnecessarily limit normal traffic flow.

FIG. 26 shows a graphic of the CT Analytic Engine in which a collector of flows (such as a Cisco NetFlow v9) receives cyphertext from the CT Core Router, which is passed to a computer, which is also connected to the Analytic Engine.

FIG. 27 show the CT flow analysis steps, in which:

The CT Analytic Engine collects CT flows representing normal traffic from the CT router to serve as training data (step 120).

Run the Maximum Entropy Estimation Algorithm to learn the normal data set (step 122).

Collect in real time CT traffic to be analyzed by the CT Analytic Engine (step 124).

Raise an alarm when there is a level of divergence between the training data set and analyzed traffic (step 126).

Maximum Entropy Estimation

The Maximum Entropy Estimation will now be described. Our approach to anomaly detection:

We use a collection of anomaly-free packets as training data to estimate the distribution of normal traffic. Then we observe the network traffic, and compare its distribution to our estimate. Whenever the observed distribution is significantly different from our estimated distribution, we determine that an anomaly is occurring.

Defining the Probability Space

Because we are observing encrypted traffic, we have very little information about the packets. We classify packets by destination Internet Protocol (IP) address, and by IP Type of Service (TOS).

For each combination of destination IP address d and TOS value t, we define the traffic class $\omega=(d, t)$ as the set of all possible packets with that address and TOS. Let $\Omega$ be the set of all traffic classes that are valid in our network. We make $\Omega$ the domain of a probability space. Let $\tilde{P}$ be the probability distribution of the training packets; then $\tilde{P}(\omega)$ is the proportion of the training packets that are in class $\omega$, and $\Sigma_{\omega \in \Omega} \tilde{P}(\omega) = 1$.

Estimating the Distribution of Normal Packets

In order to detect anomalies, we need a distribution P that estimates the distribution of normal traffic. We could use $\tilde{P}$ as our estimate, but $\tilde{P}$ is affected by random sampling error. Instead, we construct a P that is described by fewer parameters than $\tilde{P}$; therefore P should be less affected by random sampling, and be a better estimate of the true distribution of normal traffic. In other words, using P instead of $\tilde{P}$ helps avoid overtraining.

Our method for constructing P is called maximum entropy estimation based on feature functions. A feature function is a function from $\Omega$ to $\{0, 1\}$. Such a function $f$ can be identified with the subset of $\Omega$ consisting of all $\omega$ such that $f(\omega)=1$. Given a set of n feature functions $f_1, \ldots, f_n$, we consider all distributions P such that the expected values $E_P(f_i)$ and $E_{\tilde{P}}(f_i)$ are equal for $1 \leq i \leq n$. Among such distributions we choose the P with the maximum entropy. This distribution is computed using an algorithm based on [4].

Feature Selection

It remains to describe how the n feature functions $f_1, \ldots, f_n$, are chosen. Note that with n large enough, the constraints $E_P(f_i) = E_{\tilde{P}}(f_i)$ would force $P = \tilde{P}$, which would defeat the purpose of maximum entropy estimation. Let k be the number of traffic classes that occur in the training data, or in other words, the number of $\omega \in \Omega$ such that $\tilde{P}(\omega) > 0$. Since we want P described by fewer parameters than $\tilde{P}$, we require n<k. We have obtained good results using n=k−2. These features are chosen from a set of candidates described in the next subsection.

A singleton feature function is an f such that $f(\omega)=1$ for only one $\omega \in \Omega$; it corresponds to a subset of $\Omega$ with one element. We use singleton features sparingly because they seem more likely to produce overtraining. We have obtained good results by limiting the number of singleton features to $n_s = 1 + \lfloor \sqrt{k} \rfloor$. (Here $\lfloor \ \rfloor$ represents the integer floor.) These formulas for n and $n_s$ are provisional; further research could optimize them.

The feature selection process consists of n steps. Let $P_i$ be the maximum entropy distribution for the features $f_1, \ldots, f_i$. In the ith step we choose the feature $f_i$ that minimizes the Kullback-Leibler divergence between $\tilde{P}$ and the resulting $P_i$. After the nth step we let $P=P_n$.

Candidate Features

We use five groups of candidate features. They are more easily described via the corresponding subsets of $\Omega$:

1. For each traffic class $\omega \in \Omega$, the singleton feature $\{\omega\}$;
2. For each destination IP in the network, the feature consisting of all traffic classes in $\Omega$ with that destination $IP_d$;
3. For each Service class marking in the network, the feature consisting of all traffic classes in $\Omega$ with that TOS marking;
4. For each service class level in the network, the feature consisting of all traffic classes in $\Omega$ with destination $IP_d$ at that classification level;
5. For each node in the network, the feature consisting of all traffic classes in $\Omega$ with destination $IP_d$ at that node. (By "node" we mean a physical location, such as a ship.)

At some point we may want to add candidate features for both $IP_d$ and/or $IP_s$.

Anomaly Detection

The anomaly detection algorithm depends on four parameters $\delta$, d, w, and h. Some values we have used are $\delta=1$ second, w=10, h=6, and three values for d, d=0.05, d=0.2, d=0.5. We divide time into intervals of a duration $\delta$. For each interval, we observe the network traffic during that interval, count all the packets in each traffic class, and divide by the total to produce the observed distribution Q during that time interval. For each traffic class $\omega$, we compute the "relative entropy of class $\omega$":

$$D(Q \| P)(\omega) = Q(\omega) \log \frac{Q(\omega)}{P(\omega)}. \quad (1)$$

A positive value of $D(Q\|P)(\omega)$ means that class $\omega$ is more prevalent than it would be in normal data; the discrepancy is considered significant if $D(Q\|P)(\omega)>d$. An alarm is raised whenever we find some $\omega$ such that $D(Q\omega P)(\omega)>d$ during at least h out of w consecutive time intervals.

A simpler way to describe how it works:

We divide the packets into traffic classes: each possible combination of destination IP and DSCP is a traffic class. (For example, there's a traffic class consisting of all packets with destination 224.0.1.39 and DSCP 0.) In the training data, we count the number of packets in each traffic class. Then we compute each traffic class's percentage of the total. These percentages form a probability distribution on the set of traffic classes.

In the operational data, we expect the normal packets (i.e. the legitimate, non-attack packets) to have a distribution similar to the training distribution. So whenever we find that the operational distribution is very different from the training distribution, we raise an alarm, because we believe that the difference is caused by an attack. Of course, we never expect the operational distribution to perfectly match the training distribution, because both of them are affected by random variation. That's where Maximum Entropy Estimation comes in.

We create a model distribution that approximates the training distribution, but the model is simpler and less affected by random variation. So we expect the model distribution to be better for predicting the distribution of normal packets.

Here's how we build the model: we choose certain groups of traffic classes to use as "features". Here are some possible examples of features:

1. all traffic classes with the destination 224.0.1.39
2, all traffic classes with the DSCP 0
3. all traffic classes with a destination at the shore site
4. all traffic classes with a destination in an unclassified enclave.

If a particular feature includes a large percentage of the training packets, we build the model to reflect that fact. We always allow for the possibility of seeing traffic classes that did not occur in the training packets. For example, if the destination x and the DSCP y are both common in the training packets, then we build the model to expect a significant number of (x, y) packets, even if there were no (x, y) packets in the training data. On the other hand, if x and y were both absent or rare in the training data, then the model will expect (x, y) to be very rare.

The idea is that we are trying to estimate a probability distribution that is unknown, but not completely arbitrary, because it is created by people who do things for a reason. We expect the distribution to have certain regularities.

Our Candidate Features:

1. For each DSCP, all traffic classes with that DSCP
2. For each node, all traffic classes with a destination IP at that node
3. For each IP, all traffic classes with that destination IP
4. For each classification level, all traffic classes with a destination IP at that classification level.

Some or all of the steps of the present invention may be stored on a computer readable storage medium, wherein the steps are represented by computer readable programming code. The steps of the method may also be computer-implemented using a programmable device, such as a computer-based system. The method may comprise instructions that, when loaded into a computer-based system, cause the system to execute the steps of the method. The method may be implemented using various programming languages, such as "Java", "C", or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

From the above description, it is apparent that various techniques may be used for implementing the concepts of the present invention without departing from its scope. The described embodiments are to be considered in all respects as illustrative and not restrictive. In one embodiment, the Cyphertext Analytic Engine identifies cyber attacks on the CT network by recognizing anomalies within typical flows.

Alternative MetaEngine algorithms which may be used are Markov Models, Wavelet Analysis, and various Time Series methods. It should also be understood that system is not limited to the particular embodiments described herein, but is capable of many embodiments without departing from the scope of the claims.

What is claimed is:

1. In a cyphertext (CT) network, a method for detecting anomalies comprising:

analyzing cyphertext data flows within the CT network where the CT network includes one or more encryption devices for encrypting plaintext data packets into cyphertext data packets such that the cyphertext data flows are directed to one or more destination devices, where the cyphertext data includes multiple CT data packets and where each CT data packet includes header information where each header includes source address information, destination address information and differentiated service code point (DSCP) information representative of traffic class information; and analyzing the traffic class information of each header, including using maximum entropy estimation for detecting one or more anomalies within the traffic class distribution of each flow based on the header information for that traffic class;

identifying that a network attack is occurring within the CT network, identifying the IP address source of the network attack, and defining a detection threshold for indicating the occurrence of the network attack when the detection threshold is exceeded;

where the traffic classes have different assigned DSCP priority levels and including defining a set of alarms for multiple levels of attack;

policing a higher priority level of traffic classes by dynamically readjusting the packet speed for the detected traffic class;

where attack detecting includes comparing current measured traffic against an established or learned baseline for normal traffic and comparing current measured traffic against an established or learned baseline for normal traffic where the baseline is periodically updated for normal traffic;

including calculating a range of maximum entropy detection threshold values for triggering alarms when the detection threshold values are exceeded; and where the threshold has a value of at least 0.05.

2. The method of claim 1 where the threshold has a value of 0.5.

3. In a cyphertext (CT) network, a method for detecting anomalies comprising:

analyzing cyphertext data flows within the CT network where the CT network includes one or more encryption devices for encrypting plaintext data packets into cyphertext data packets such that the cyphertext data flows are directed to one or more destination devices, where the cyphertext data includes multiple CT data packets and where each CT data packet includes header information where each header includes source address information, destination address information and differentiated service code point (DSCP) information representative of traffic class information, where the DSCP information is unchanged within the cyphertext data flows; and analyzing the traffic class information of each header, including using maximum entropy estimation for detecting one or more anomalies within the traffic class distribution of each flow based on the header information for that traffic class, including:

identifying that a network attack is occurring within the CT network, identifying the IP address source of the network attack and defining a detection threshold for indicating the occurrence of the network attack when the detection threshold is exceeded;

where the traffic classes have different assigned DSCP priority levels and including defining a set of alarms for multiple levels of attack, including;

policing a higher priority level of traffic classes having a DSCP value between 18-24 by dynamically readjusting the packet speed for the detected traffic class;

where attack detecting includes comparing current measured traffic against an established or learned baseline for normal traffic;

where attack detecting includes comparing current measured traffic against an established or learned baseline for normal traffic where the baseline is periodically updated for normal traffic, including;

calculating a range of maximum entropy detection threshold values for triggering alarms when the detection threshold values are exceeded;

including using a collection of anomaly-free packets as training packets to estimate the distribution of normal traffic.

4. The method of claim 3 where destination x information and DSCP y information are both common in the training packets with the expectation of a significant number of (x, y) packets even if there are no (x, y) packets in the training data to allow for detecting traffic classes that do not occur in the training packets.

* * * * *